United States Patent
Takano et al.

(10) Patent No.: US 9,842,261 B2
(45) Date of Patent: Dec. 12, 2017

(54) VEHICLE MONITORING DEVICE AND METHOD OF MONITORING VEHICLE

(75) Inventors: Teruhisa Takano, Kawasaki (JP); Shinji Yasuhara, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 714 days.

(21) Appl. No.: 14/119,324

(22) PCT Filed: Apr. 17, 2012

(86) PCT No.: PCT/JP2012/060303
§ 371 (c)(1),
(2), (4) Date: Nov. 21, 2013

(87) PCT Pub. No.: WO2012/160902
PCT Pub. Date: Nov. 29, 2012

(65) Prior Publication Data
US 2014/0085477 A1    Mar. 27, 2014

(30) Foreign Application Priority Data

May 24, 2011 (JP) ................. 2011-115428
Jun. 23, 2011 (JP) ................. 2011-139062
Jun. 23, 2011 (JP) ................. 2011-139136

(51) Int. Cl.
*G06K 9/00* (2006.01)
*B60R 25/30* (2013.01)
*H04N 7/18* (2006.01)

(52) U.S. Cl.
CPC ........ *G06K 9/00791* (2013.01); *B60R 25/305* (2013.01); *H04N 7/18* (2013.01); *H04N 7/188* (2013.01)

(58) Field of Classification Search
CPC .... B60R 25/305; G06K 9/00791; H04N 7/18; H04N 7/188
(Continued)

(56) References Cited

U.S. PATENT DOCUMENTS

2004/0155963 A1* 8/2004 Kondo ................. G05B 15/02
348/180
2005/0030381 A1* 2/2005 Tanigawa ............... H04N 5/145
348/155
(Continued)

FOREIGN PATENT DOCUMENTS

JP      11-334536 A    12/1999
JP      2003-127835 A   5/2003
(Continued)

OTHER PUBLICATIONS

Communication and extended European Search Report dated Feb. 3, 2015 from the corresponding European Patent Application No. 12789798.1.

*Primary Examiner* — Deirdre Beasley
(74) *Attorney, Agent, or Firm* — Young Basile Hanlon & MacFarlane, P.C.

(57) ABSTRACT

A vehicle monitoring system is provided which determines the mode of display and the compressibility of a moving image, a streaming video and a still image based on a monitoring level determined by vehicle conditions detected. The system generates a monitoring image using the determined display mode or compressed at the determined compressibility and transmits the monitoring image to an external terminal device.

26 Claims, 16 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2005/0099273 A1* | 5/2005 | Shimomura | ........ | B60R 25/1004 340/426.1 |
| 2005/0273219 A1* | 12/2005 | Kitao | ...................... | B60R 25/00 701/2 |
| 2006/0276942 A1* | 12/2006 | Anderson | ............ | G07C 5/0858 701/33.4 |
| 2007/0132849 A1* | 6/2007 | Hill | .................. | G08B 13/19636 348/159 |
| 2008/0204556 A1* | 8/2008 | de Miranda | .......... | B60R 25/102 348/148 |
| 2009/0135252 A1* | 5/2009 | Matsuda | .......... | G08B 13/19656 348/143 |
| 2009/0153312 A1* | 6/2009 | Tanaka | ..................... | B60Q 9/00 340/426.1 |
| 2010/0097470 A1* | 4/2010 | Yoshida | ........... | G08B 13/19641 348/159 |
| 2010/0245583 A1* | 9/2010 | Harel | ................ | G08B 13/19656 348/159 |
| 2010/0246669 A1* | 9/2010 | Harel | .................. | G06F 11/1004 375/240.02 |
| 2011/0052045 A1* | 3/2011 | Kameyama | ............. | G06T 9/001 382/154 |
| 2011/0060496 A1* | 3/2011 | Nielsen | ............... | G06Q 10/0631 701/31.4 |
| 2011/0102634 A1* | 5/2011 | Pardue | .................. | H04N 7/181 348/231.9 |
| 2012/0021386 A1* | 1/2012 | Anderson | .............. | G09B 9/042 434/66 |
| 2012/0105635 A1* | 5/2012 | Erhardt | ................. | B60R 25/102 348/148 |
| 2012/0293653 A1* | 11/2012 | Schweikart | ............. | E21C 41/00 348/143 |

FOREIGN PATENT DOCUMENTS

| | | |
|---|---|---|
| JP | 2005-065238 A | 3/2005 |
| JP | 2005-073218 A | 3/2005 |
| JP | 2006-041770 A | 2/2006 |
| JP | 2006-107279 A | 4/2006 |

\* cited by examiner 1a to 1d: Camera
2a to 2d: Proximity sensor
10: Control device or unit
100: Monitoring device
1000: Vehicle monitoring system
200: Vehicle controller
400: Communication device 800 : External terminal device
810: Communication unit
820: IMage proccessing unit
830: Display
300: IGN. SW.
900: Communication line

FIG. 2

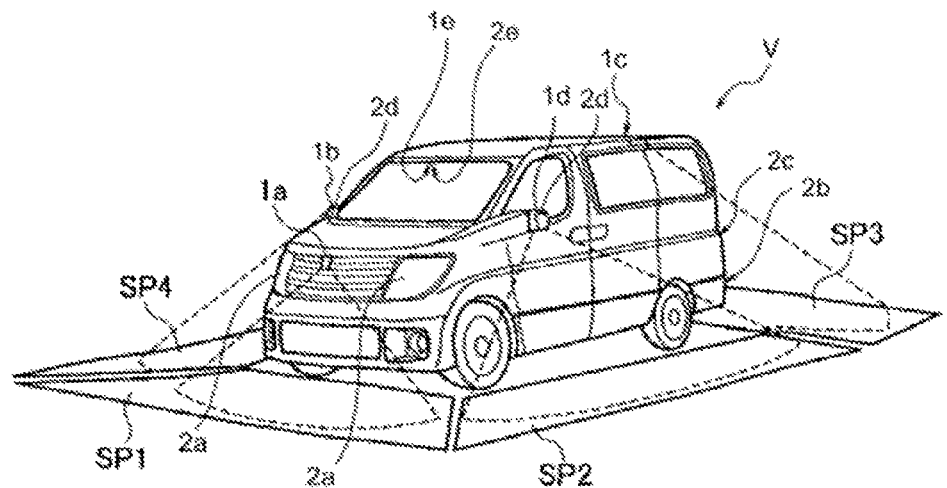

FIG. 3

| Moving image | fps | | LV | Vehicle condition/state |
|---|---|---|---|---|
| Streaming image<br>High<br>↑<br>Frame rate<br>↓<br>Low<br>(Standard)<br>Still image | 30 | enhanced<br>↑<br>Monitoring level<br>↓<br>Not enhanced (STD) | Level 7 | Abnormality occuring (Highly urgent) |
| | 20 | | Level 6 | Monitoring object staying for a predetermined time (in Motion) |
| | 10 | | Level 5 | Monitoring object approaches vehilce (motion feature) |
| | 5 | | Level 4 | Monnitoring object approaches vehicle (no motion feature) |
| | 1 (Still image) | | Level 3 | Monitoring object separating |
| | 1 (Still image) | | LEVEL 2 | Still object |
| | 1 (Still image) | | LEVEL 1 | Request for monitoring image |

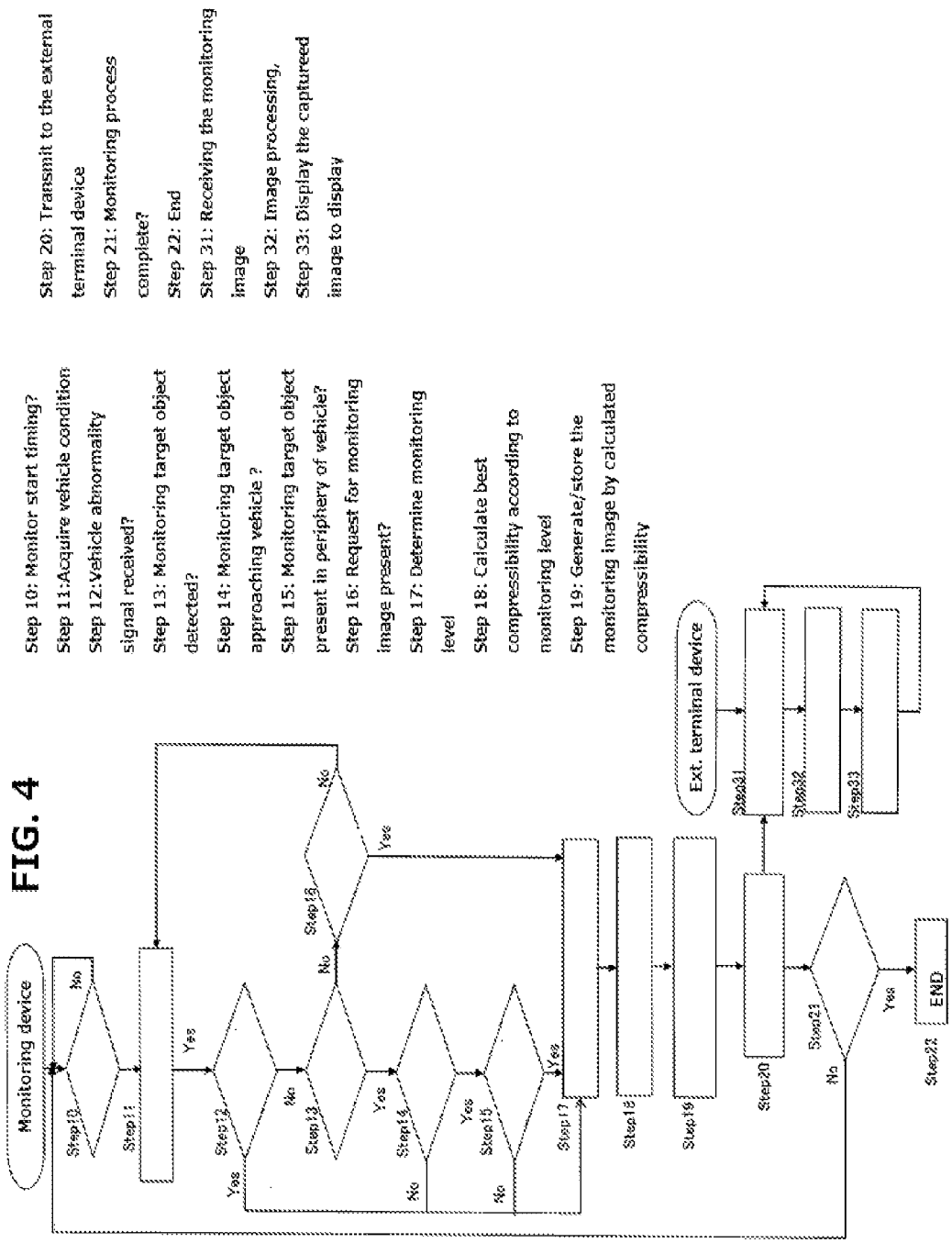

FIG. 5

| | fps | | LV | Vehicle condition/state |
|---|---|---|---|---|
| Low | 100 | enhanced | Level 7 | Abnormality occuring (Highly urgent) |
| ⇧ | 90 | ⇧ Monitoring level ⇩ | Level 6 | Monitoring object staying for a predetermined time (in Motion) |
| | 80 | | Level 5 | Monitoring object approaches vehilce (motion feature) |
| | 70 | | Level 4 | Monnitoring object approaches vehicle (no motion feature) |
| ⇩ | 60 | Not enhanced (STD) | Level 3 | Monitoring object separating |
| High (Standard) | 50 | | LEVEL 2 | Still object |
| | 40 | | LEVEL 1 | Request for monitoring image |

1a to 1d: Camera
2a to 2d: Proximity sensor
10: Control device or unit
100: Monitoring device
1000: Vehicle monitoring system
200: Vehicle controller
400: Communication device 800: External terminal device
810: Communication unit
820: Image processing unit
830: Display
300: IGN. SW.
900: Communication line

FIG. 10

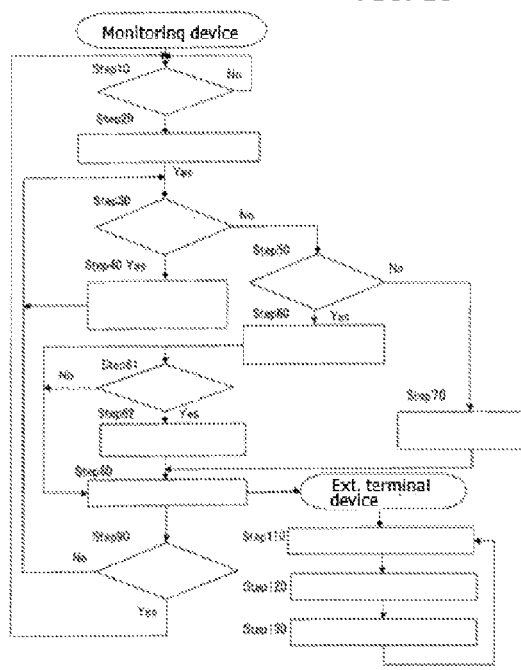

Step 10: Monitoring start timing?
Step 20: Start capturing image.
          Acquire captured image
Step 30: Initial or first captured
          image?
Step 40: Store as reference monitoring
          image & transmit to Ext. terminal
Step 50: Monitoring target object present?
Step 60: Generate/store monitoring image
          of moving image
Step 61: Is moving speed less than
          predetermined value?
Step 62: Reduce frame rate
Step 70: Generate/store monitoring image
          in still image
Step 80: Transmit the monitoring image to
          terminal device
Step 90: Monitoring process complete?
Step 110: Receive monitoring image
Step 120: Image processing
Step 130: Display monitoring image on display

FIG. 11

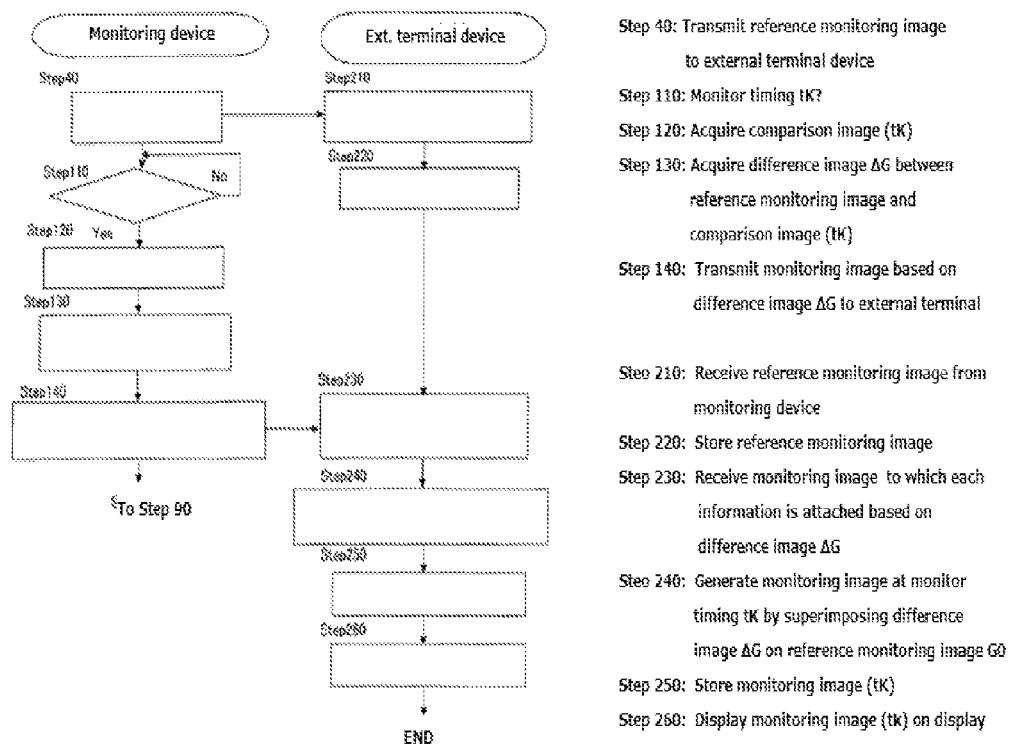

Step 40: Transmit reference monitoring image
to external terminal device
Step 110: Monitor timing tK?
Step 120: Acquire comparison image (tK)
Step 130: Acquire difference image ΔG between
reference monitoring image and
comparison image (tK)
Step 140: Transmit monitoring image based on
difference image ΔG to external terminal Step 210: Receive reference monitoring image from
monitoring device
Step 220: Store reference monitoring image
Step 230: Receive monitoring image to which each
information is attached based on
difference image ΔG
Step 240: Generate monitoring image at monitor
timing tK by superimposing difference
image ΔG on reference monitoring image G0
Step 250: Store monitoring image (tK)
Step 260: Display monitoring image (tk) on display

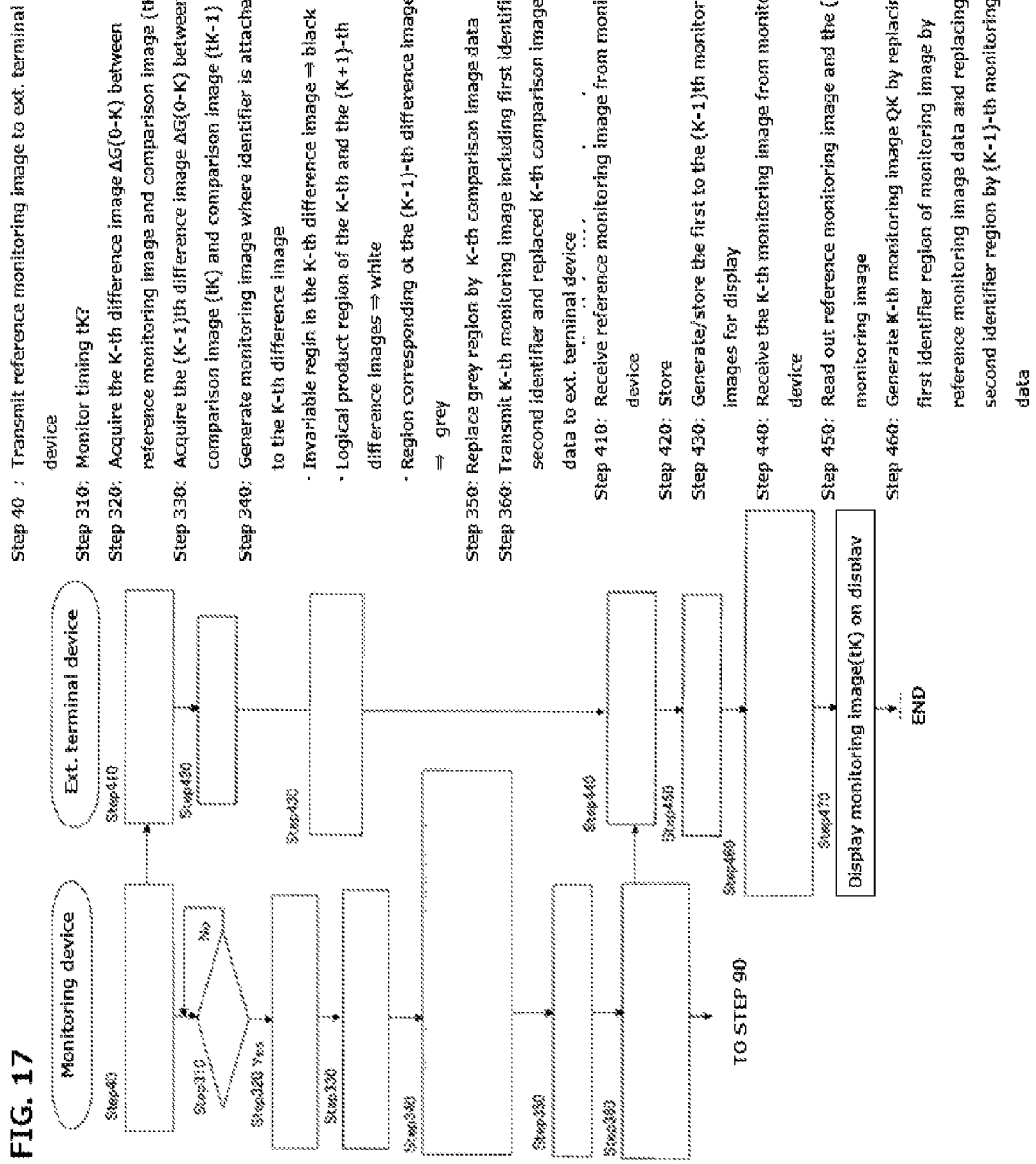

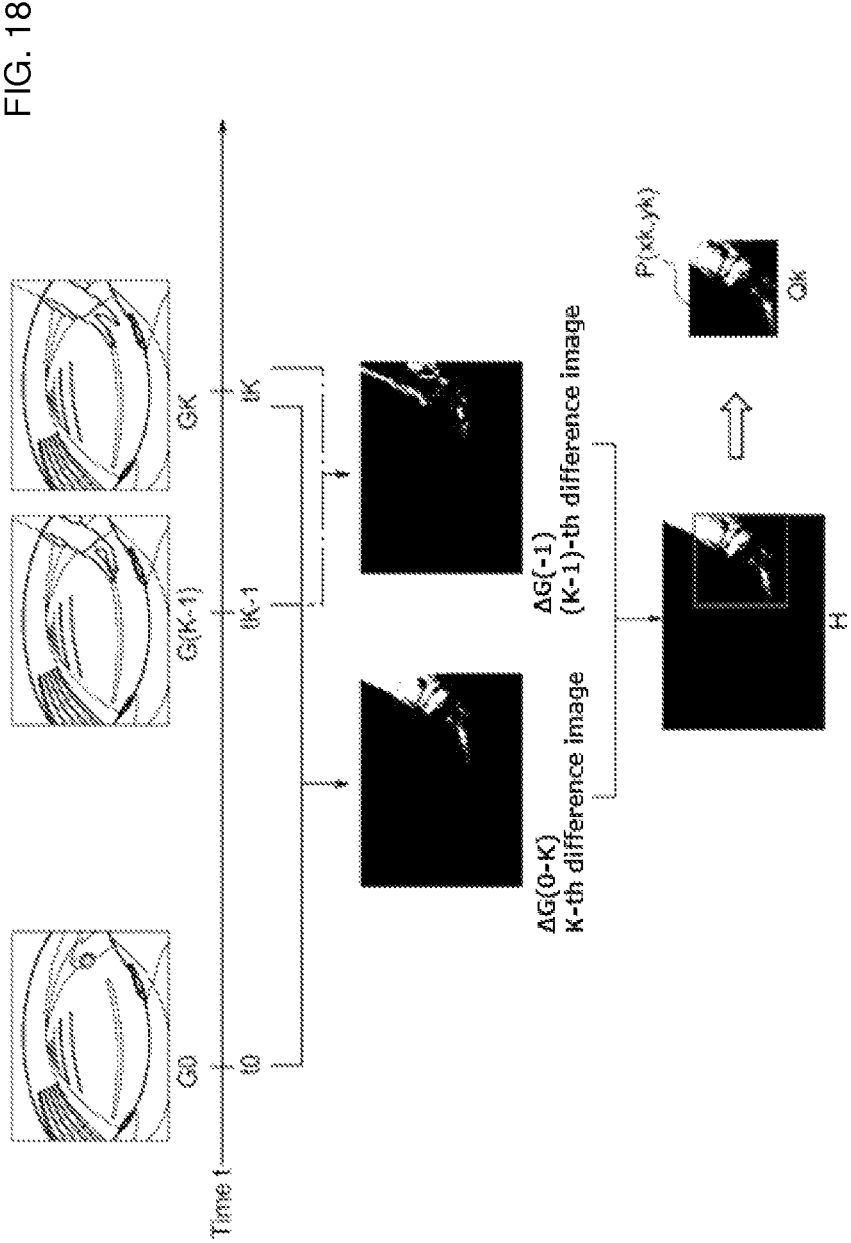

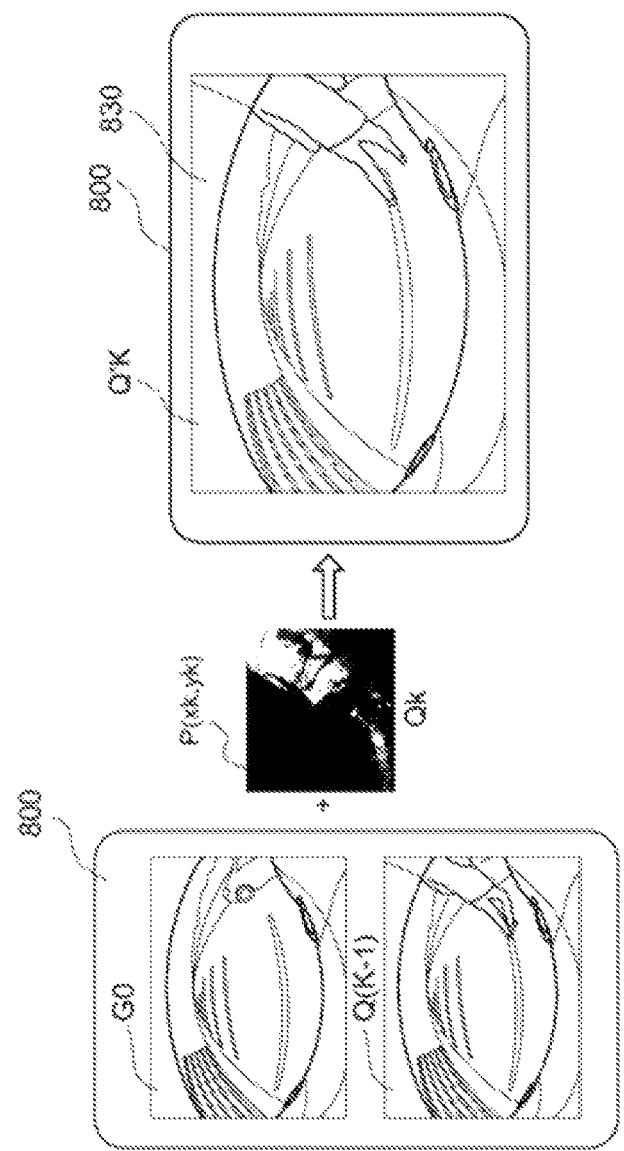

ated monitoring image for display in the external terminal
VEHICLE MONITORING DEVICE AND METHOD OF MONITORING VEHICLE

CROSS REFERENCE TO RELATED APPLICATIONS

The present application claims priority to Japanese Patent Application No. 2011-115428, filed May 24, 2011, Japanese Patent Application No. 2011-139062 filed Jun. 23, 2011 and Japanese Patent Application No. 2011-139136 filed Jun. 23, 2011, each incorporated herein in its entirety.

TECHNICAL FIELD

The present invention relates to a vehicle monitoring system and a method of monitoring the surroundings of the vehicle using a camera installed in the vehicle.

BACKGROUND

With regard to monitoring systems to monitor a vehicle's surroundings, a security system is known in which upon detection of external stimulus such as detected by a door contact sensor, a camera is employed to capture the surroundings and the image information will be transmitted to an outside mobile phone or the like. See, for example, JP-A No. 2006-107279. However, when a captured image of the camera is sent as it is, i.e., without change, there is a large burden of communication time and cost.

BRIEF SUMMARY

The objective that the present invention is to achieve is to reduce the amount of communication data when transmitting to an external terminal device the image captured by the camera.

The present invention solves this problem by generating a captured image in one of the display modes selected from a video, streaming, or still image to transmit to the outside depending on a monitoring level determined from a vehicle state, by generating a monitoring image in a display mode with a higher frame rate as a monitoring level determined from the state of the vehicle, or by generating a monitoring image with a compression ratio to transmit to the outside when an object to be monitored is detected.

According to the present invention, since a monitoring image is transmitted in a display mode in accordance with the monitoring level to an external terminal device, it is possible to indicate an image of monitoring object in a suitable display mode. In addition, it is possible to reduce the total amount of data of the monitoring image to be transmitted in order to monitor the surroundings of the vehicle as compared to a case in which the captured image of camera is sent as it is. Further, according to the present invention, the monitoring image is sent to the external terminal device compressed by a compression ratio in accordance the monitoring level, it is possible to reduce the total amount of data of the monitoring image to be transmitted in order to monitor the surroundings of the vehicle as compared to a case in which the captured image of camera is sent as it is. As a result, it is possible to reduce the communication cost required for monitoring the vehicle.

BRIEF DESCRIPTION OF THE DRAWINGS

The description herein makes reference to the accompanying drawings wherein like reference numerals refer to like parts throughout the several views, and wherein:

FIG. 2 is a diagram illustrating an installation example of a camera;

FIG. 3 is a diagram showing an example of the relationship between the monitoring level and the display mode;

FIG. 4 is a flowchart showing a control procedure for a vehicle monitoring system;

FIG. 5 is a diagram showing an example of the relationship between a monitoring level and a compression ratio;

FIG. 10 is a flowchart showing a control procedure of the vehicle monitoring system of the third embodiment;

FIG. 11 is a flowchart showing a control procedure of the vehicle monitoring system of a fourth embodiment;

FIG. 17 is a flowchart showing a control procedure of the vehicle monitoring system of the fifth embodiment;

FIG. 18 is a diagram for explaining the generation method of monitoring image of the vehicle monitoring system in the fifth embodiment; and FIG. 19 is a diagram for explaining a method of generating monitoring image for display in the external terminal device in the fifth embodiment.

DETAILED DESCRIPTION

Below, explanation will be made with reference to the accompanying drawings of a first embodiment according to the present invention. In the present embodiment, explanation will be made of the vehicle monitoring device according to the present invention as applied to a monitoring device 100 for monitoring a moving body including a vehicle and a vehicle monitoring system provided with this monitoring device. Note that the monitoring object of the vehicle monitoring device is not limited to vehicles. It is also possible to monitor mobile bodies such as motorcycles, boats, heavy equipment, and forklifts.

Figure 1:
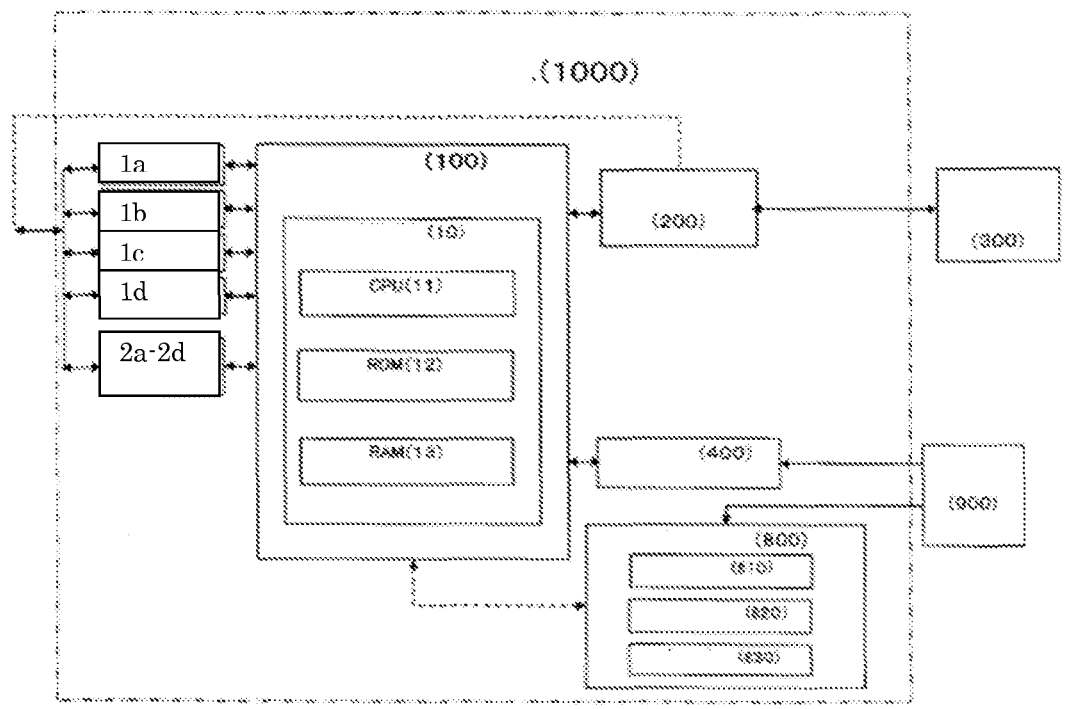
FIG. 1 is a block diagram of a vehicle monitoring system comprising a monitoring system in the present embodiment pertaining to the present invention.

FIG. 1 is a block diagram of a vehicle monitoring system 1000 including a monitoring device 100 according to the present embodiment. As shown in FIG. 1, the vehicle monitoring system 1000 according to the present embodiment includes four cameras 1a~1d mounted in the vehicle (to be collectively referred to as camera 1 in some cases).

FIG. 2 is a diagram showing an example of arrangement when cameras 1a~1d are mounted on the vehicle V. The cameras 1a to 1d are constructed by using an imaging device such as CCD of (Charge Coupled Devices) and the like, and are respectively disposed at different positions outside the vehicle V to capture each image in the four directions around the vehicle. For example, as shown in FIG. 2, the camera 1a that is disposed at a predetermined position in front of the vehicle V such as near a front grill, captures the image of an object or image of the road surface (front view image) in the front area SP1 of the vehicle and in the space in front thereof. The camera 1d installed at a predetermined position of the left side of the vehicle V such as the left side mirror captures the image of an object or road surface present in the left side area SP2 and in a space in its surrounding (left side view image). The camera 1c placed at a predetermined position of the rear of the vehicle V, such as a roof spoiler captures an object or road surface present in the right side area SP4 and in a space in its surrounding (rear view image). The camera 1b disposed at a predetermined position on the right side of the vehicle V, such as the right side mirror captures an image of an object and road surface present camera to photograph an image of an object and the road surface (right side view image) present in the area SP4 at the right side of the vehicle and in a space of the surrounding thereof. The control unit 10 receives each captured image captured by the cameras 1a to 1d, respectively. Note that the number of cameras 1 installed and the installing positions may be suitably determined in according to the size, shape, or setting method of the detection region. The plurality of cameras 1 are assigned an identifier corresponding to each address (arrangement) so that the control unit 10 may identify each of the cameras 1 based on the identifier. Further, the control unit 10 may send an activation command and other commands to a specific camera 1 by the assigned identifier.

As shown in FIG. 2, in the vicinity of the camera 1a~1d, proximity sensors 2a~2d are arranged. The proximity sensors 2a to 2d can detect whether an object is present in a specific area surrounding the vehicle V, or an object surrounding the vehicle is approaching or departing from the vehicle V. The sensor 2a~2d may be formed by ultrasonic sensors, proximity sensors, infrared sensors, or capacitive sensor.

Further, the vehicle monitoring system 1000 according to the present embodiment includes a monitoring device 100, a vehicle controller 200, a communication device 400, and an external terminal device 800. The vehicle monitoring system 1000 may comprise an ignition switch 300 that can exchanges information with the vehicle controller 200. Each of these devices can be connected through a vehicle-mounted LAN CAN (Controller Area Network) and can exchange information each other.

In the vehicle monitoring system 1000 in the present embodiment, the monitoring device 100 can communicate with an external terminal device 800 (computer) equipped with a mobile phone, smartphone or other communication device 810 via the communication device each other. Further, the external terminal device 800 is provided with a communication device 810, an image processing device 820, and a display 830. The communication device 810 obtains the captured image from the side of the vehicle monitoring device 100, while the image processing device 820 executes image processing required for display in accordance with a display mode (moving image/video, streaming, or still image). The display 830 displays the captured image. A user holding the external terminal device 800 may confirm the captured image of the vehicle transmitted from the vehicle monitoring device using the external terminal device 800.

As shown in FIG. 1, the controller or control unit 10 of the monitoring device 100 pertaining to present embodiment is provided with a ROM 12 that stores programs for determining a monitoring level, and generating a monitoring image in a display mode in accordance with the monitoring level to transmit to the external terminal device 800, a CPU (Central Processing Unit) that functions as the monitoring device 100 by executing the programs stored in the ROM 12, and a RAM (Random Access Memory) 13 that functions as an accessible storage unit.

The controller 10 of the monitoring device pertaining to the present embodiment has a monitoring level determination function, a monitoring image generating function, and may perform each function by the collaboration of the software to perform the transmission function and the hardware described above. In the present embodiment, an example of mode is described in which the controller 10 transmits each control instruction. However, the controller 10 in the present embodiment may control the camera 1 and the communication device 400 via a vehicle controller 200, as well.

Though not particularly limited, the monitoring device 100 in the present embodiment can start a monitoring process when an OFF signal of an engine is input to the ignition switch 300 and an electronic key having a communication function of the vehicle V is not present in the vicinity of the vehicle V (i.e., the user carrying the electronic key is remote from the vehicle), or when a request command for transmission of the monitoring image from the external terminal device 800 of the user has been received. Incidentally, the trigger of the monitoring process is not limited thereto, but the monitoring device 100 may start the monitoring process such as, when a sonar (not shown) detects an object around the vehicle V, when the door contact sensor detects the abnormality such as the contact to door, when the tilt sensor detects an abnormal inclination of the vehicle (such as ingress), when an abnormality detection sensor detects the abnormality such as forcible opening of door or cracking of windows, when a monitoring target object is detected from the image captured by the camera 1a, and when a switch (not shown) for the monitoring device 100 has received an input, etc.

Further, the monitoring device 100 pertaining to the first embodiment is provided with an image processing control unit (IPCU). Using the image processing control unit, the control device 10 analyses the captured images of each camera 1, extracts an image corresponding to an object from data of captured image, and determines based on a displacement amount of the extracted image whether or not the detected object is a moving object and, if yes, calculates the displacement amount. The control unit 10 may calculate a steady change in position or a change in position over time of the object based on the change of the captured image. Based on this steady change in the position of the object, the control unit 10 may detect the monitoring target object. The image processing may use a technique known in the field at the time of the present application.

Hereinafter, description will be made of the monitoring level determining function, the monitoring image generating function, and transmission function respectively performed by the monitoring device 100 pertaining to the present embodiment according to the present invention.

First, the monitoring level decision function is described. The control device 10 of the monitoring device 100 pertaining to the present embodiment detects information (signal) indicating the vehicle V or the situation in the vicinity of the vehicle V and determines a monitoring level of the vehicle based on the detected vehicle situation (information corresponding to the vehicle condition).

The control device 10 pertaining to the present embodiment considers the possibility that hazardous situation would occur with the vehicle is high when "a monitoring target object in the periphery of the vehicle V" is detected from the image captured by the camera 1a~1d. The monitoring target object in the present embodiment is, for example, a human that can move and is of a certain heights. The control unit 10 may determine that a monitoring target object has been detected when an image corresponding to an object with a predetermined height or more from the captured image of the camera 1, and the position of the object changes over time. For these processes, the image processing control unit (IPCU) may be used. Further, the control unit 10 can detect the presence of the moving monitoring target object using the detection result of the proximity sensors 2a to 2d.

In addition, the control device 10 of the present embodiment analyses the captured image photographed by the camera 1 over time, and, when "the monitoring target object approaching the vehicle V" is detected from the captured image, considers the possibility with which the vehicle would undergo the risk is high. The control device 10 may determine that the monitoring target object is approaching the vehicle V by the situations in which the area of the image corresponding to the monitoring target object detected from the captured image increases over time, or in which the distance of the monitoring object is smaller over time.

The control device 10 in the present exemplary embodiment considers that the possibility is high risk of danger occurs in the vehicle V when, from the captured image, "a monitoring target object is detected that stays for a predetermined time or more" in the neighbor region of the vehicle V. The control unit 10 may determine that the monitoring target object stays in the neighborhood of the vehicle by either when the area of the object corresponding to the monitoring target object detected from the captured image assumes a predetermined value or more over a predetermined time, or when the distance of presence of the monitoring target object detected by the proximity sensors 2a to 2d are less than a predetermined value over a predetermined time.

Furthermore, the control device 10 in the present exemplary embodiment considers the possibility of high risk of danger occurring when an abnormality signal has been acquired by various vehicle condition detection sensors provided with the vehicle V. As the abnormality detection sensors, a contact sensor that detects contact of human body and the like during a engine-off state, a unlocking sensor that detects unlock of the door (forcible opening or pry), an inclination sensor that detects the inclination of the vehicle when the human body gets in the vehicle, and the like may be used, which is known at the time of application.

On the other hand, the control device 10 in the present embodiment considers that the risk of danger with the vehicle V is not high when a monitoring target object is not detected from the captured image of the camera 1, or when the monitoring target object, even detected, goes away from the vehicle V, or no abnormality signal is received from the vehicle.

As described above, the controller 10 may, based on the vehicle condition detected, associate in advance the vehicle status and the monitoring level. FIG. 3 is a diagram showing an example of the correspondence relationship between the monitoring level and the vehicle status. As shown in FIG. 3, when an abnormality occurrence signal is acquired from the vehicle, the monitoring level is set to level 7 which is most enhanced since the abnormality has occurred in the vehicle already and the status of urgency is deemed high. When the monitoring target object detected by the captured image of the camera 1 is staying a predetermined time or more, the monitoring level will be determined as level 6 stringent next to the level 7 since the possibility of doing harm on the vehicle such as by trying to open the door of the vehicle is high. Further, when the monitoring target object detected by the captured image of the camera 1 is approaching the vehicle, the monitoring level is set to level 5 stringed next to the level 6 since it is considered that the possibility is high with which the vehicle is peeped into for something or being in reconnaissance. Then, when the monitoring target object has been detected from the captured image of the camera 1, the monitoring level is set to the next since such a situation is estimated in which a suspicious individual may touch the vehicle. Though not specifically limited, the level 7 to level 4 may be defined as a reinforced level to strengthen supervision. As the monitoring level becomes higher, the number that indicates the enhancement level to strengthen the monitoring will be increased.

As shown in the figure, when the monitoring target object detected by the captured image of the camera is separating from the vehicle, since the monitoring target object is considered to be a passerby who passes near the vehicle, the monitoring level is determined to be level 3 next to level 4. When the object detected by the captured image of the camera 1 is a stationary object, since it is considered that the one such as a building has been detected, the monitoring level is determined to be even lower level 2. In this case, when a request command for the monitoring image is received from the external terminal device of the user, since this is not a situation based on the condition of the vehicle, the monitoring level may be determined to be even lower level 1. Though not particularly limited, the levels 3 to 1 may be defined as a standard level requiring only for a normal or ordinary monitoring.

Subsequently, a description will be given of the monitoring image generation function of the control device 10 of the monitoring device 100 in the present embodiment. The control device 10 of the present embodiment generate a monitoring image based on the captured image captured by the camera 1 in a display mode with the number of frames per unit time (hereinafter also referred to as frame rate) obtained in accordance with the defined (determined) monitoring level. Incidentally, the frame rate in the present embodiment means the number of frames per unit time. It is possible to arbitrarily set the unit time described here, and the unit time is not limited to one second.

The control unit 10 in the present embodiment, as described above, generates a monitoring image any of the images with difference frame rates among a moving image, streaming and a still image based on the captured image captured by cameras mounted on the vehicle in accordance with an enhanced level when the monitoring level is determined to be an enhanced level (for example, levels 7 to 4 in FIG. 3). The control unit 10 in the present embodiment generates with higher frame rates as the enhanced level is higher. Specifically, the control device 10 in the present embodiment generates a monitoring image of a still image of the lowest frame rate when the monitoring level is at the standard level (default monitoring level) while generating the monitoring image of a streaming image or moving image which have a higher frame rate than the still image when the monitoring level is at a higher, enhanced level. The unit time may be one second or several seconds. The still image is intended to be a single image to be captured or displayed per unit time. In the streaming video or a moving video, a plurality of images are captured or displayed per unit time. The number of frames per unit time (frame rate) of the moving image is larger than the number of frames per unit time (frame rate) of the streaming image. Note that the number of frames per unit time (frame rate) defined as the streaming video and the number of framed per unit time (frame rate) defined as the moving image are set appropriately.

Thus, in cases where the monitoring level is determined to be high and, in order to strengthen monitoring, such a monitoring image is requested which makes the movement of the monitoring target object around the vehicle discernible, a monitoring image such as a moving image with high frame rate or streaming video which distinguish the movement may be generated/provided.

Further, the control device 10 in the present embodiment may generate a monitoring image (for example, still image) in a display mode with a frame rate applicable at the timing of normal monitoring (when the monitoring level is not strengthened) in accordance with the standard level (monitoring level) when the monitoring level is determined to be a standard level (e.g., at level 3 to 1 shown in FIG. 3). Note that the display mode applicable during the normal monitoring is not limited to still images.

For example, the control unit in the present embodiment, as shown in FIG. 3, when the monitoring level is at level 7, the frame rate (fps: frame per second) will be set about 30 and a monitoring image will be generated in which 30 captured images are able to be reproduced or renewable continuously per unit time (for example, one second). In other words, at a high monitoring level, the monitoring image in moving image of high frame rate to make the movement of the monitoring target object easier to grasp. Further, as shown in the figure, as the monitoring level lowers (the strengthening level of monitoring decreases), the frame rate of the monitoring image may be reduced. Specifically, when the monitoring level is at level 6, the frame rate may be set about 20, at level 5 about frame rate of 10, at level 4 about frame rate of 5, respectively.

Incidentally, since the frame rate in the present embodiment is the number of images to be reproduced per unit time, it is possible to obtain a still image when it is 1, a monitoring image of the video when the frame rate is about 20 to 30. And a monitoring image of streaming video which, though no smoothness of the video being available, shows by frame advance the movement of the monitoring object. The higher the number of frame rate goes up, a monitoring or surveillance image of smoothness and easy-to-grasp of the movement of the monitoring target object is obtainable. On the other hand, as the numerical value of the frame rate is increased, the amount of data to be transmitted to the external terminal device 800 also increases and the communication cost increases.

The control device 10 in the present embodiment can generate a monitoring image at a default frame rate when the monitoring level is at a normal or standard level of 3 or less. In the example shown in FIG. 3, when the monitoring level is at level 3, a still image at frame rate 1 may be generated. In the present embodiment, although an example in which the default frame rate is a single is shown, the value of a plurality of two or three are also possible. Note that, as for level 1 to level 3, it is possible to apply the same frame rate.

Incidentally, FIG. 3 merely shows an example of a frame rate. The frame rate in accordance with the monitoring level can be arbitrarily.

As described above, by generating a monitoring image of frame rate according to the monitoring level, in the case where such information is requested that urgently track the motion of the monitoring target object, a moving image or streaming video with a high frame rate may be generated while, at low check urgency and when it suffices to merely confirm the state around the vehicle, a monitoring image of small data amount may be generated although only a static state at the frame rate of a single is discernible. Thus, it is possible to reduce the amount of data by generating a monitoring image in the display mode different dependent on the monitoring level while sending a still image when it is not necessary to track the motion. As a result, it is possible to reduce the total amount of communication data when transmitting the monitoring image to an external terminal device 800 and to reduce the communication cost of the monitoring system during operation.

Furthermore, the control device 10 in the present embodiment can generate a monitoring image of the frame rate set high in the number of frame rate per unit time acquired depending on the monitoring level when detection of the monitoring level is made after sunset. After sunset, it is generally dark and is difficult in many cases to obtain a clear captured image. Therefore, the control device 10 in the present embodiment corrects the frame rate obtained based on the correspondence relationship shown in FIG. 3 higher after sunset. Generally, even in the nighttime when the monitoring image becomes unclear, by increasing the frame rate, it is possible to provide a high video frame rate for easy identification of the movement of the monitored object. Thus, during night, when the underexposure is a concern, by increasing the frame rate, it is possible to provide a monitoring image which shows the motion of the monitoring target object clearly and preventing the monitoring image from being obscured.

Incidentally, as a method for determining whether or not it is after sunset, it is possible to determine by comparing the time of sunset information according to location and time on the clock provided with the control device 10. Also, it is possible to detect the brightness around the vehicle from a brightness sensor mounted on the vehicle. The detection of the surrounding brightness may be made by using a CCD camera device 1.

On the other hand, when the time the monitoring level is detected is before sunset, the control device 10 is able to correct the frame rate obtained in accordance with the monitoring level lower or maintain the same.

In addition, for the captured image of the camera 1 that detects the monitoring target object, the control device 10 in the present embodiment can increase the frame rate from the viewpoint of obtaining a monitoring image in the display mode that can track the motion. Specifically, the control device 10 can generates, when a monitoring target object is included in the captured image captured by the camera 1, the monitoring image of the picked up image captured by the camera 1 in a display mode at a frame rate corrected higher in accordance with the monitoring level.

When an abnormality occurs on the vehicle or in vehicle condition in the vicinity of the vehicle V, or when the monitored object is detected, although a monitoring image that may track the motion of the monitoring target object is requested, there may be times where all the monitoring images are not needed to be converted into the moving image or streaming video. In the present embodiment, only the display mode of any of the monitoring image among the cameras 1a to 1d is set to a moving image or streaming video while the monitoring images based on the captured images by the other cameras are set to still images, it is possible to reduce the total amount of data of the monitoring image to be finally transmitted to the external terminal device 800 while maintaining the capability to track the motion of the monitoring target object.

Furthermore, the control device 10 in the present embodiment can increase the frequency at when the monitoring image is generated when the monitoring level is determined at an enhanced level. When an abnormality occurs on the vehicle V or in vehicle condition of the surroundings of the vehicle V, or when the monitoring target object is detected, the control device 10 in the present embodiment create the most recent monitoring image at a high frequency. When the generated monitoring image is transmitted to the external terminal device 800, the user confirms the latest vehicle condition real time by way of the external terminal device 800.

Finally, a description is give of the communication functions of the control device 10 in the present embodiment. The control device 10 may transmit to an external terminal device 800 by using a communication line 900 available as a public communication network the information including the generated monitoring image. The control unit 10 can store, when the monitoring image is a moving image, stores as a single moving image file, while, when the monitoring image is a streaming video, stores in a mode in which transmission and reproduction may be possible in a streaming method.

The following describes the procedure of the vehicle monitoring system 1000 in the present embodiment according to the present invention. FIG. 4 is a flowchart showing a control procedure of the vehicle monitoring system 1000 according to the present embodiment.

In step 10, the controller 10 of the monitoring device 100 in the present embodiment determines whether or not the control is in the monitoring start time. In the present embodiment, in a case a vehicle key is not present nearby with engine off, the control device recognizes the time at which a request command for monitoring image from the external terminal device 800 of the user's possession as the monitoring start timing to start the monitoring process.

In step 11, the monitoring device 100 acquires vehicle condition information indicating a situation of the vehicle or that in the vicinity of the vehicle V. More specifically, the monitoring device 100 acquires each captured image of the imaging region when the abnormality signal from the various vehicle state detection sensors such as a door contact sensor, an inclination sensor, an abnormality detection sensor is detected.

In step 12, the control device 10, upon acquiring the abnormality occurrence signal from various vehicle condition detection sensors such as a door contact sensor, an inclination sensor, and an abnormality detection sensor, proceeds to step 17.

If an error occurrence signal is not detected, the process proceeds to step 13, the control device 10 determines whether or not the monitoring target object is present based on the captured image captured by the camera 1. If the monitoring target object is not even present, process waits for a monitoring image request in step 16, and, unless the monitoring image request is input, the control continues to perform step 11 and subsequent process. When the monitoring image request is received in step 16, control proceeds to step 17.

When the monitoring target object is detected in step 13, determination is made in step 14 whether or not the monitoring target object is approaching the vehicle. In step 14, though the monitoring target object being detected, when no approach is determined, control proceeds to step 17.

On the other hand, when the monitoring target object is detected and is approaching the vehicle, control proceeds further to step 15 to determine whether or not the monitoring target object is staying in the vicinity of the vehicle for a predetermined time or more. In step 15, though the monitoring target object being present and approaching the vehicle, when it does not stay for the predetermined time or more, or, when the monitoring target object is present and approaching the vehicle, and staying for the predetermined time, the control proceeds in both cases to step 17.

In step 17, the controller 10 determines the monitoring level of the vehicle V based on the vehicle condition that is acquired in the course of steps 12 to 16. In determining the monitoring level, it is possible to refer to the correspondence relationship shown in FIG. 3.

After determining the monitoring level, in step 18, the controller 10 determines the frame rate or display mode according to the monitoring level. In determining the monitoring level, it is possible to refer to the correspondence relationship shown in FIG. 3. In step 19 that follows, the control unit 10 generates a monitoring image in the display mode according to the frame rate calculated. The monitoring image generated is stored at least temporarily.

In step 20, the controller 10 transmits to the external terminal device 800 the information including the monitoring image generated and the process is repeated until termination of the monitoring process has been determined to be completed.

In step 31, in the external terminal device 80, the communication device 810 receives the monitoring image sent from the monitoring device 100, performs the necessary image processing by the image processing device 820 in step 32, and the display 830 displays the information including the monitoring image in the specified display mode.

In the present embodiment, an example has been described in which the monitoring device 100 is disposed on the vehicle V. However, the monitoring method of the vehicle pertaining to the present embodiment according to the present invention, in a server (computer, control device) capable of exchanging information with clients (computer, control device) that can control the camera 1 and communication device 400, a part or all the process may be performed. The server can be placed separated from the client.

The monitoring device 100 and the vehicle monitoring system 100 composed and operable as above exhibit According to the monitoring device 100 in the present embodiment, since the monitoring image of the captured image captured by the camera 1 mounted on the vehicle V is sent to the external terminal device 800 in a display mode obtained based on the monitoring level determined based the vehicle or vehicle condition of the surroundings of the vehicle, the monitoring target image is indicated in an appropriate display mode and, compared to the case in which the captured image of camera is transmitted as it is, the total amount of data of the monitoring image to be sent to monitor the surroundings of the vehicle may be reduced. As a result, the transmission cost required for monitoring vehicles may be reduced.

In the case of using the monitoring method of the vehicle in the present embodiment, the same operation as the monitoring device 100 is performed to attain the same effect.

According to the monitoring device 100 pertaining to the present embodiment, when presence of a monitoring target object is detected from the captured image, the monitoring level of the vehicle V is determined to be an enhanced level, and the monitoring image of the moving image or streaming video with a frame rate higher than the normal frame rate is transmitted to the external terminal device 800. Thus, when reinforcing the monitoring by increasing the frame rate the monitoring image of moving image or streaming video that can track the motion of the monitoring target object is generated. When there is no need to reinforce the monitoring by lowering the frame rate a monitoring image of small data amount may be generated. Consequently, the transmission cost required for vehicle monitoring may be reduced.

According to the monitoring device 100 pertaining to the present embodiment, when the monitoring target object approaching the vehicle V from the captured image captured by the camera 1 has been detected, the monitoring level of the vehicle V is determined to be the enhanced level, and since the monitoring image of moving image or streaming video with a frame rate higher than the normal frame rate to the external terminal device 800, when reinforcing monitoring by increasing the frame rate the monitoring image of the moving image or streaming video that can track the motion of the monitoring target object is generated, and when there is no need to reinforce the monitoring, by lowering the frame rate the monitoring image of small data amount may be generated. Consequently, the transmission cost required for vehicle monitoring may be reduced.

According to the monitoring device 100 pertaining to the present embodiment, when a monitoring target object is detected in the vicinity of the vehicle which is staying for a predetermined time or more, the monitoring level of the vehicle V is determined to be an enhanced level, since the monitoring image of moving image or streaming video with a frame rate higher than the normal frame rate to the external terminal device 800, when reinforcing the monitoring by increasing the frame rate the monitoring image of moving image or streaming video that can track the motion of the monitoring target object is generated, and when there is no need to enhance the monitoring, by lowering the frame rate a monitoring image of small data amount may be generated. Consequently, the transmission cost required for vehicle monitoring may be reduced.

According to the monitoring device 100 pertaining to the present embodiment, when acquiring the abnormality signal from the vehicle V, the monitoring level is determined to be an enhanced level and since the monitoring image of moving image or streaming video with frame rate higher than the normal frame rate is transmitted to the external terminal device 800, when reinforcing the monitoring by increasing the frame rate the monitoring image of moving image or streaming video with a frame rate higher than the normal frame rate that can track the motion of the monitoring target object is generated, and when there is no need to reinforce the monitoring by lowering the frame rate a monitoring image of small data amount may be generated. Consequently, the transmission cost required for vehicle monitoring may be reduced.

According to the monitoring device 100 pertaining to the present embodiment, in the case of obtaining the request for a monitoring image from the external terminal device 800, the monitoring level of the vehicle is determined to be a standard level, and since the monitoring image in a display mode with equal to or lower frame rate than the normal frame rate is transmitted to the external terminal device 800, when there is no need to reinforce the monitoring by lowering the frame rate the monitoring image of small data amount may be generated. Consequently, the transmission cost required for vehicle monitoring may be reduced.

According to the monitoring device 100 pertaining to the present embodiment, when the monitoring level is detected after sunset, since the monitoring image of the captured image the frame rate of which is corrected higher is transmitted to the external terminal device 800, during night where the underexposure is a concern, the monitoring image will be prevented from being obscure due to lowering of the frame rate.

According to the monitoring device 100 pertaining to the present embodiment, since the captured image captured by the camera 1 that picks up the captured image including a monitoring target object is corrected with a high frame rate according to the monitoring level and sent in a display mode after the correction to the external terminal device 800, only the captured image of the camera 1 that has picked up the captured image including an image corresponding to the monitoring target object is generated in a moving image or streaming video with high frame rate and the remaining captured images are generated in a still image of lower frame rate, the total amount of the data of the monitoring image to the external terminal device 800 may be eventually reduced.

According to the monitoring device 100 pertaining to the present embodiment, when the monitoring level is determined to be an enhanced level, since the frequency of monitoring image generation may be increased, at the time of reinforced monitoring where the most recent monitoring image is required, the latest monitoring image at high frequency may be generated for transmission to the external terminal device 800. Thus, the user may confirm the latest vehicle condition by the external terminal device 800.

Next, a description will be given of a monitoring device 100 and a vehicle monitoring system provided with the monitoring device 100 in a second embodiment. Because the configuration of the monitoring device 100 and the vehicle monitoring system 1000 in the second embodiment is basically common to the configuration of the monitoring apparatus 100 and the vehicle monitoring system 1000 in the first embodiment shown in FIGS. 1 and 2, the description in the first embodiment is referenced to for the common matters and description below is made mainly on the differences.

Hereinafter, description will be given of a monitoring level determination function, a monitoring image generation function, and a transmission function performed by the monitoring device 100 pertaining to the present embodiment according to the present invention, First, the monitoring level determination function is described. The control device 10 of the monitoring device 100 pertaining to the present embodiment detect information (signal) indicating the vehicle V or the surrounding condition of the vehicle V and determines a monitoring level of this vehicle based on the detected vehicle condition (information according to the vehicle condition).

The control device 10 of the present embodiment considers the probability of hazard occurrence on the vehicle to be high, when "a monitoring target object present in the periphery of the vehicle V" is detected. The monitoring target object in the present embodiment is, for example, a human that can move and is of a certain heights. The control unit 10 may determine that a monitoring target object has been detected when an image corresponding to an object with a predetermined height or more from the captured image of the camera 1, and the position of the object changes over time. For these processes, the image processing control unit (IPCU) may be used. Further, the control unit 10 can detect the presence of the moving monitoring target object using the detection result of the proximity sensors 2a to 2d.

In addition, the control device 10 of the present embodiment analyses the captured image photographed by the camera 1 over time, and, when "the monitoring target object approaching the vehicle V" is detected from the captured image, considers the possibility with which the vehicle would undergo the risk is high. The control device 10 may determine that the monitoring target object is approaching the vehicle V by the situations in which the area of the image corresponding to the monitoring target object detected from the captured image increases over time, or in which the distance of the monitoring object is smaller over time.

The control device 10 in the present exemplary embodiment considers that the possibility is high risk of danger occurs in the vehicle V when, from the captured image, "a monitoring target object is detected that stays for a predetermined time or more" in the neighbor region of the vehicle V. The control unit 10 may determine that the monitoring target object stays in the neighborhood of the vehicle by either when the area of the object corresponding to the monitoring target object detected from the captured image assumes a predetermined value or more over a predetermined time, or when the distance of presence of the monitoring target object detected by the proximity sensors 2a to 2d are less than a predetermined value over a predetermined time.

Furthermore, the control device 10 in the present exemplary embodiment considers the possibility of high risk of danger occurring when an abnormality signal has been acquired by various vehicle condition detection sensors provided with the vehicle V. As the abnormality detection sensors, a contact sensor that detects contact of human body and the like during an engine-off state, a unlocking sensor that detects unlock of the door (forcible opening or pry), an inclination sensor that detects the inclination of the vehicle when the human body gets in the vehicle, and the like may be used, which is known at the time of application.

On the other hand, the control device 10 in the present embodiment considers that the risk of danger with the vehicle V is not high when a monitoring target object is not detected from the captured image of the camera 1, or when the monitoring target object, even detected, goes away from the vehicle V, or no abnormality signal is received from the vehicle.

As described above, the controller 10 may, based on the vehicle condition detected, associate in advance the vehicle status and the monitoring level. FIG. 3 is a diagram showing an example of the correspondence relationship between the monitoring level and the vehicle status. As shown in FIG. 3, when an abnormality occurrence signal is acquired from the vehicle, the monitoring level is set to level 7 which is most enhanced since the abnormality has occurred in the vehicle already and the status of urgency is deemed high. When the monitoring target object detected by the captured image of the camera 1 is staying a predetermined time or more, the monitoring level will be determined as level 6 stringent next to the level 7 since the possibility of doing harm on the vehicle such as by trying to open the door of the vehicle is high. Further, when the monitoring target object detected by the captured image of the camera 1 is approaching the vehicle, the monitoring level is set to level 5 stringed next to the level 6 since it is considered that the possibility is high with which the vehicle is peeped into for something or being in reconnaissance. Then, when the monitoring target object has been detected from the captured image of the camera 1, the monitoring level is set to the next since such a situation is estimated in which a suspicious individual may touch the vehicle. Though not specifically limited, the level 7 to level 4 may be defined as a reinforced level to strengthen supervision. As the monitoring level becomes higher, the number that indicates the enhancement level to strengthen the monitoring will be increased.

As shown in the figure, when the monitoring target object detected by the captured image of the camera is separating from the vehicle, since the monitoring target object is considered to be a passerby who passes near the vehicle, the monitoring level is determined to be level 3 next to level 4. When the object detected by the captured image of the camera 1 is a stationary object, since it is considered that the one such as a building has been detected, the monitoring level is determined to be even lower level 2. In this case, when a request command for the monitoring image is received from the external terminal device of the user, since this is not a situation based on the condition of the vehicle, the monitoring level may be determined to be even lower level 1. Though not particularly limited, the levels 3 to 1 may be defined as a standard level requiring only for a normal or ordinary monitoring.

Subsequently, a description will be given of the monitoring image generation function of the control device 10 of the monitoring device 100 in the present embodiment. The control device 10 in the present embodiment generates a monitoring image compressing the captured image captured by the camera 1 at the compressibility in accordance with the determined monitoring level.

The control device 10 in the present embodiment can generate, as described above, when the monitoring level is determined to be an enhanced (e.g. levels 7 to 4 shown in FIG. 5), a monitoring image compressing the captured image captured by the camera 1 at compressibility lower than a standard compressibility applicable at level other than the enhanced level. Thus, when the monitoring level is determined to be high and a detailed monitoring image with low data compressibility is requested, it is possible to generate and provide a monitoring image of good quality at low data compressibility.

Further, when the monitoring level is determined to be a normal level (e.g., levels 3 to 1 shown in FIG. 5) as described above, in accordance with the normal level, the control device 10 in the present embodiment can generate a monitoring image compressing the captured image of camera 1 at a standard compressibility (default compression) or more which is applied at the time of normal monitoring (when the monitoring level is not enhanced).

Though not particularly limited, the control unit in the present embodiment generates, as shown in FIG. 5, when the monitoring level is at level 7, a monitoring image at 100% of compressibility, i.e., as it is in the captured condition. In other words, when the monitoring level is high, it is possible to generate a monitoring image not deteriorated in the image quality of the captured image. Further, as shown in the figure, as the monitoring level lowers (the strengthening level of monitoring decreases), the compressibility to generate the monitoring image may be increased. Specifically, when the monitoring level is at level 6, the compressibility may be set 90%, at level 5 80%, at level 4 at 70%, respectively. In addition, since the compressibility represents a degree of compression or compression ratio in the present embodiment, it is possible to obtain image data identical to the original image data at a 100% compression ratio, at 50% the original data amount may be reduced to a half. In other words, as the value of compressibility lowers, the degree of compression will be higher.

The control device 10 in the present embodiment can generate a monitoring image at a default, standard compressibility or less when the monitoring level is at a normal or standard level of 3 or less. In the example shown in FIG. 5, when the monitoring level is at level 3, the compressibility may be set to 60%, at the monitoring level being level 2 the compressibility to 50%, and at the monitoring level being level 1 compressibility to 40%, respectively. For the levels 3 to 1, a common, standard compressibility may be applicable.

Incidentally, FIG. 5 merely shows an example of the compressibility or compression ratio, and the compressibility or the standard compressibility may be set arbitrarily corresponding to the monitoring level.

As described above, by generating a monitoring image by compressing the captured image at compressibility according to the monitoring level, in the case where detailed information is requested urgently, the monitoring image of good image quality at low compressibility may be generated, whereas, in the case where the urgency is low and such information is requested that urgently track the motion of the monitor detailed information is required, a monitoring image of small data amount may be generated, though the image quality being low due to high compressibility. As a result, it is possible to reduce the total amount of communication data when transmitting the monitoring image to an external terminal device 800 and to reduce the communication cost of the monitoring system during operation.

Furthermore, the control device 10 in the present embodiment can generate a monitoring image of the compressibility after correcting to a lower compressibility acquired in accordance with the monitoring level when detection of the monitoring level is made after sunset. After sunset, it is generally dark and is difficult in many cases to obtain a clear captured image. Therefore, the control device 10 in the present embodiment corrects the compressibility acquired based on the correspondence relationship shown in FIG. 5 lower after sunset. Thus, during night, when the underexposure is a concern, by lowering the compressibility, it is possible to prevent the monitoring image from being obscured.

Incidentally, as a method for determining whether or not it is after sunset, it is possible to determine by comparing the time of sunset information according to location and time on the clock provided with the control device 10. Also, it is possible to detect the brightness around the vehicle from a brightness sensor mounted on the vehicle. The detection of the surrounding brightness may be made by using a CCD camera device 1.

On the other hand, when the time the monitoring level is detected is before sunset, the control device 10 is able to correct the compressibility acquired in accordance with the monitoring level higher or maintain the same.

In addition, for the captured image of the camera 1 that detects the monitoring target object, the control device 10 in the present embodiment can lower the compressibility from the viewpoint of obtaining a detailed monitoring image. Specifically, the control device 10 can generates, when a monitoring target object is included in the captured image captured by the camera 1, the monitoring image of the picked up image captured by the camera 1 after correcting the compressibility to be set in accordance with the monitoring level lower.

When an abnormality occurs on the vehicle or in vehicle condition in the vicinity of the vehicle V, or when the monitored object is detected, although a detailed monitoring image is required, not all the monitoring images are needed to be displayed. In the present embodiment, only any of the captured images of the cameras 1a to 1d that has captures a picked up image corresponding to a monitoring target object are compressed to at low compressibility while the captured images of the other cameras 1a to 1d are compressed in high compressibility. Thus, it is possible to reduce the total amount of data of the monitoring image to be eventually transmitted to the external terminal device 800 while maintaining the high quality of the image that has captured the monitoring target object.

Furthermore, the control device 10 in the present embodiment can increase the frequency at when the monitoring image is generated when the monitoring level is determined at an enhanced level. When an abnormality occurs on the vehicle V or in vehicle condition of the surroundings of the vehicle V, or when the monitoring target object is detected, the control device 10 in the present embodiment create the most recent monitoring image at a high frequency. When the generated monitoring image is transmitted to the external terminal device 800, the user confirms the latest vehicle condition real time by way of the external terminal device 800.

Finally, a description is give of the communication functions of the control device 10 in the present embodiment. The control device 10 may transmit to an external terminal device 800 the information including the generated monitoring image by using a communication line 900 available as a public communication network. The monitoring image can be stored as a single moving image file or in a mode in which transmission and reproduction is available in a streaming method.

Figure 6:
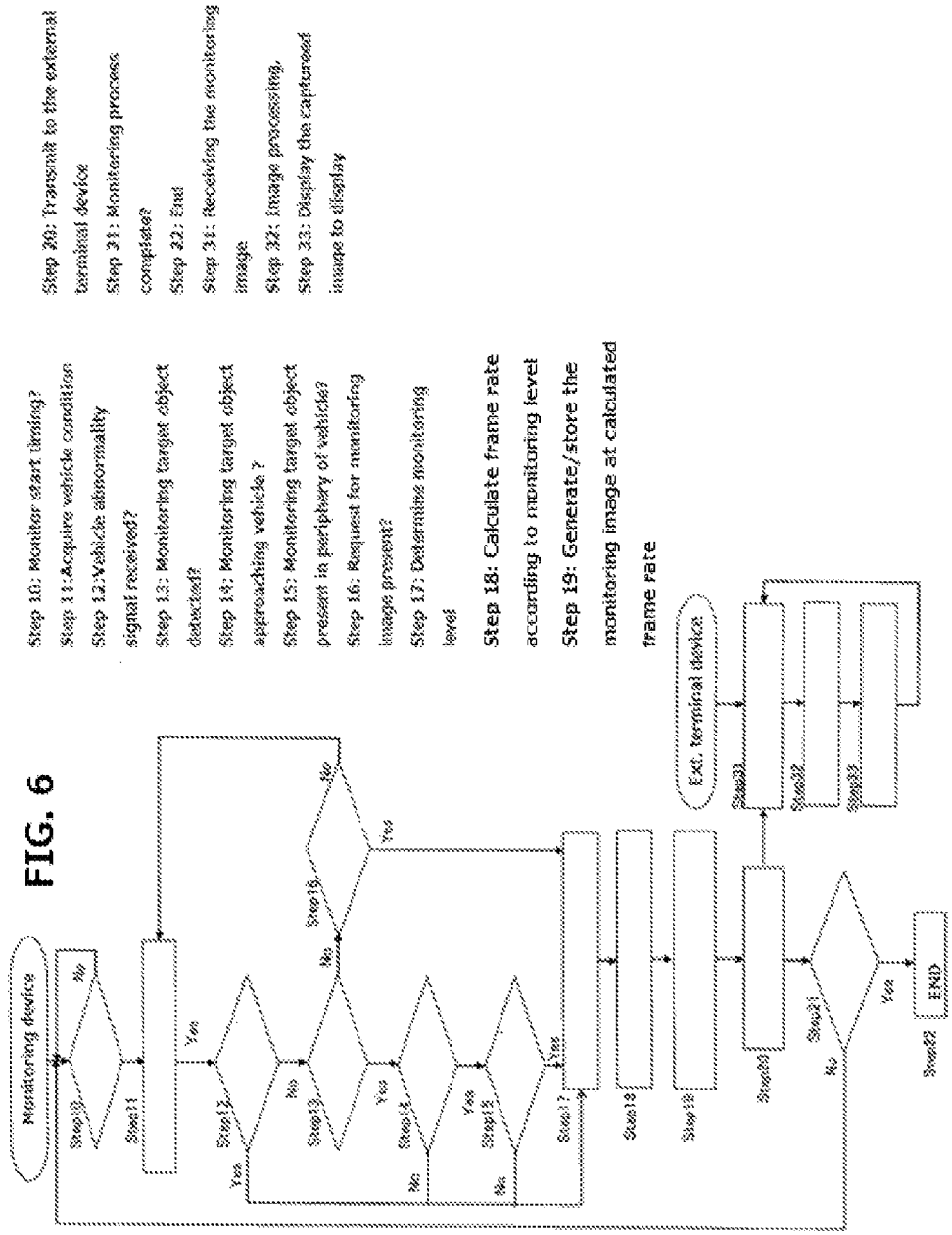
FIG. 6 is a flowchart showing a control procedure in a vehicle monitoring system.

The following describes the procedure of the vehicle monitoring system 1000 in the present embodiment according to the present invention. FIG. 6 is a flowchart showing a control procedure of the vehicle monitoring system 1000 according to the present embodiment.

In step 10, the controller 10 of the monitoring device 100 in the present embodiment determines whether or not the control is in the monitoring start time. In the present embodiment, in a case a vehicle key is not present nearby with engine off, the control device recognizes the time at which a request command for monitoring image from the external terminal device 800 of the user's possession as the monitoring start timing to start the monitoring process.

In step 11, the monitoring device 100 acquires vehicle condition information indicating a situation of the vehicle or that in the vicinity of the vehicle V. More specifically, the monitoring device 100 acquires each captured image of the imaging region when the abnormality signal from the various vehicle state detection sensors such as a door contact sensor, an inclination sensor, an abnormality detection sensor is detected.

In step 12, the control device 10, upon acquiring the abnormality occurrence signal from various vehicle condition detection sensors such as a door contact sensor, an inclination sensor, and an abnormality detection sensor, proceeds to step 17.

If an error occurrence signal is not detected, the process proceeds to step 13, the control device 10 determines whether or not the monitoring target object is present based on the captured image captured by the camera 1. If the monitoring target object is not even present, process waits for a monitoring image request in step 16, and, unless the monitoring image request is input, the control continues to perform step 11 and subsequent process. When the monitoring image request is received in step 16, control proceeds to step 17.

When the monitoring target object is detected in step 13, determination is made in step 14 whether or not the monitoring target object is approaching the vehicle. In step 14, though the monitoring target object being detected, when no approach is determined, control proceeds to step 17.

On the other hand, when the monitoring target object is detected and is approaching the vehicle, control proceeds further to step 15 to determine whether or not the monitoring target object is staying in the vicinity of the vehicle for a predetermined time or more. In step 15, though the monitoring target object being present and approaching the vehicle, when it does not stay for the predetermined time or more, or, when the monitoring target object is present and approaching the vehicle, and staying for the predetermined time, the control proceeds in both cases to step 17.

In step 17, the controller 10 determines the monitoring level of the vehicle V based on the vehicle condition that is acquired in the course of steps 12 to 16. In determining the monitoring level, it is possible to refer to the correspondence relationship shown in FIG. 5.

After determining the monitoring level, in step 18, the controller 10 determines the compressibility according to the monitoring level. In determining the monitoring level, it is possible to refer to the correspondence relationship shown in FIG. 5. In step 19 that follows, the control unit 10 generates a monitoring image compressed according to the calculated compressibility. The monitoring image generated is stored at least temporarily.

In step 20, the controller 10 transmits to the external terminal device 800 the information including the monitoring image generated and the process is repeated until termination of the monitoring process has been determined to be completed.

In step 31, in the external terminal device 80, the communication device 810 receives the monitoring image sent from the monitoring device 100, performs the necessary image processing by the image processing device 820 in step 32, and the display 830 displays the information including the monitoring image in the specified display mode.

In the present embodiment, an example has been described in which the monitoring device 100 is disposed on the vehicle V. However, the monitoring method of the vehicle pertaining to the present embodiment according to the present invention, in a server (computer, control device) capable of exchanging information with clients (computer, control device) that can control the camera 1 and communication device 400, a part or all the process may be performed. The server can be placed separated from the client.

The monitoring device 100 and the vehicle monitoring system 100 composed and operable as above produce the following results.

According to the monitoring device 100 in the present embodiment, since the monitoring image of the captured image captured by the camera 1 mounted on the vehicle V is sent to the external terminal device 800 at the compressibility calculated according to the monitoring level determined based on the vehicle or vehicle condition of the surroundings of the vehicle, the total amount of monitoring image data for monitoring the surroundings of the vehicle may be reduced compared to the case in which transmission is made constantly at a prefixed compressibility. As a result, the transmission cost required for monitoring vehicles may be reduced.

In the case of using the monitoring method of the vehicle in the present embodiment, the same operation as the monitoring device 100 is performed to attain the same effect.

According to the monitoring device 100 pertaining to the present embodiment, when presence of a monitoring target object is detected from the captured image, the monitoring level of the vehicle V is determined to be an enhanced level, and the monitoring image of the captured image compressed at a lower compressibility than a normal, standard compressibility is transmitted to the external terminal device 800. Thus, when reinforcing the monitoring by lowering the compressibility a monitoring image of high quality may be generated. When there is no need to reinforce the monitoring by increasing the compressibility a monitoring image of small amount of data may be generated. Consequently, the transmission cost required for vehicle monitoring may be reduced.

According to the monitoring device 100 pertaining to the present embodiment, when the monitoring target object approaching the vehicle V from the captured image captured by the camera 1 has been detected, the monitoring level of the vehicle V is determined to be the enhanced level, and since the monitoring image that compresses the captured image at a compressibility lower than the normal, standard compressibility is transmitted to the external terminal device 800, when reinforcing monitoring by lowing the compressibility a monitoring image of good image quality may be generated. When there is no need to reinforce the monitoring, by increasing the compressibility the monitoring image of small data amount may be generated. Consequently, the transmission cost required for vehicle monitoring may be reduced.

According to the monitoring device 100 pertaining to the present embodiment, when a monitoring target object is detected in the vicinity of the vehicle which is staying for a predetermined time or more, the monitoring level of the vehicle V is determined to be an enhanced level. Since the monitoring image that is obtained by compressing the captured image at a compressibility lower than the normal, standard compressibility is transmitted to the external terminal device 800, when reinforcing the monitoring by lowering the compressibility the monitoring image of high quality is generated, and when there is no need to enhance the monitoring, by increasing the compressibility a monitoring image of small data amount may be generated. Consequently, the transmission cost required for vehicle monitoring may be reduced.

According to the monitoring device 100 pertaining to the present embodiment, when acquiring the abnormality signal from the vehicle V, the monitoring level is determined to be an enhanced level and since the monitoring image compressed from the captured image at a compressibility lower than the normal, standard compressibility is transmitted to the external terminal device 800, when reinforcing the monitoring by lowering the compressibility the monitoring image of high quality is generated, and when there is no need to reinforce the monitoring by increasing the compressibility a monitoring image of small data amount may be generated. Consequently, the transmission cost required for vehicle monitoring may be reduced.

According to the monitoring device 100 pertaining to the present embodiment, in the case of obtaining the request for a monitoring image from the external terminal device 800, the monitoring level of the vehicle is determined to be a standard level, and since the monitoring image that is compressed at the compressibility equal to or higher than the standard compressibility is transmitted to the external terminal device 800. Thus, when there is no need to reinforce the monitoring by increasing the compressibility higher than the standard compressibility the monitoring image of small data amount may be generated. Consequently, the transmission cost required for vehicle monitoring may be reduced.

According to the monitoring device 100 pertaining to the present embodiment, when the monitoring level is detected after sunset, since the monitoring image of the captured image the frame rate of which is corrected higher is transmitted to the external terminal device 800, when during night the underexposure is a concern, by lowering the frame rate the monitoring image will be prevented from being obscure.

According to the monitoring device 100 pertaining to the present embodiment, since the captured image captured by the camera 1 that picks up the captured image including a monitoring target object is corrected with a high frame rate according to the monitoring level and sent in a display mode after the correction to the external terminal device 800, only the captured image of the camera 1 that has picked up the captured image including an image corresponding to the monitoring target object is generated in a moving image or streaming video with high frame rate and the remaining captured images are generated in a still image of lower frame rate, the total amount of the data of the monitoring image to the external terminal device 800 may be eventually reduced.

According to the monitoring device 100 pertaining to the present embodiment, when the monitoring level is determined to be an enhanced level, since the frequency of monitoring image generation may be increased, at the time of reinforced monitoring where the most recent monitoring image is required, the latest monitoring image at high frequency may be generated for transmission to the external terminal device 800. Thus, the user may confirm the latest vehicle condition by the external terminal device 800.

The vehicle monitoring system 1000 and the monitoring apparatus 100 according to the above exemplary embodiment produce the following results.

According to the monitoring apparatus 100 according to the present exemplary embodiment, the compression rate calculated in accordance with the level of monitoring is determined based on the vehicle condition in the vicinity of the vehicle V, and captured by one camera installed in the vehicle V. Since the sending to the external terminal device 800 a monitoring image obtained by compressing the captured image, than when it is delivered at the compression rate constant, the total amount of data of the monitoring image to be transmitted is reduced in order to monitor the surroundings of the vehicle. As a result, it is possible to reduce the communication cost required for monitoring the vehicle.

Even when using the method of monitoring the vehicle V in the present exemplary embodiment, it is possible to exert the same action as a monitoring device 100, to obtain the same effects.

According to the monitoring apparatus 100 according to the present exemplary embodiment, when the presence of the monitored object is detected, from the image captured by the camera 1, the enhanced level monitoring level of the vehicle V and the standard conventional compression are determined. Due to compressing the captured image compression rate lower than the rate required to generate a monitoring image with good quality, to lower the compression rate and enhance the monitoring time to strengthen monitoring, it is possible to generate a monitoring image having a small amount of data by increasing the compression ratio if no. As a result, it is possible to reduce the communication cost required for monitoring the vehicle.

According to the monitoring apparatus 100 according to the present exemplary embodiment, when the monitored object approaching the vehicle V from the captured image captured by the camera 1 has been detected, monitoring level of the vehicle V is determined to be the enhanced level. Since the monitoring image that compresses the captured image at the compressibility lower than the normal standard compressibility is transmitted to the external terminal device 800, a monitoring image with good quality to lower the compression ratio is generated, it is possible to generate a monitoring image having a small amount of data by increasing the compression ratio when there is no need to be strengthened. As a result, it is possible to reduce the communication cost required for monitoring the vehicle.

According to the monitoring apparatus 100 according to the present exemplary embodiment, when the monitored object to stay predetermined time or longer in the neighbor region of the vehicle V from the captured image captured by the camera 1 has been detected, and enhance the monitoring level of the vehicle V it is determined that the level, since the transmitted to the external terminal device 800 monitoring image obtained by compressing the captured image in the lower compression ratio than the standard normal compression ratio, the monitoring image with good quality and a lower compression ratio when strengthen supervision it is possible to generate a monitoring image having a small amount of data by increasing the compression ratio when there is no need to generate and strengthen the monitoring. As a result, it is possible to reduce the communication cost required for monitoring the vehicle.

According to the monitoring apparatus 100 according to the present embodiment, when acquiring the abnormality signal from the vehicle V, enhanced level monitoring level of the vehicle V is determined, and the captured image is in the lower compression ratio than the standard normal compression ratio. Since the images sent to the external terminal device 800 were compressed, the compression ratio can be increased when there is no need to generate a monitoring image with good quality to lower the compression rate and enhance the monitoring time to strengthen monitoring it is possible to generate a monitoring image having a small data amount. As a result, it is possible to reduce the communication cost required for monitoring the vehicle.

According to the monitoring apparatus 100 according to the present exemplary embodiment, in the case of obtaining the request monitoring image from the external terminal device 800, the normal level monitoring level of the vehicle V, and the compression ratio of the standard compression ratio are determined. Since the monitoring image sent to the external terminal device 800 is obtained by compressing the captured image, it is possible to generate a monitoring image having a small amount of data to a standard compression ratio or compression ratio when it is not necessary to strengthen the monitoring. As a result, it is possible to reduce the communication cost required for monitoring the vehicle.

According to the monitoring apparatus 100 in the present embodiment, since the monitoring image that compresses the captured image at a compression set low is transmitted to the external terminal device 800, during night and when the underexposure is a concern, it is possible to prevent the monitoring image from being obscure.

According to the monitoring device 100 in the present embodiment, the captured image picked up by the camera capturing the captured image of the monitoring target object is corrected at a low compressibility acquired in accordance with the monitoring level and is subsequently, i.e. after correction, to the external terminal device 800. Thus, only the captured image picked up by the camera 1 that has captured an image including the monitoring target object is compressed at a low compressibility while the other captured images are compressed at high compressibility. Thus, it is possible to reduce the total amount of data of the monitoring image to be sent to an external terminal device 800 eventually.

According to the monitoring device 100 pertaining to the present embodiment, when the monitoring level is determined to be an enhanced level, since it is possible to increase the frequency of generating a monitoring image, when the latest image is required, it is possible to generate the latest image at high frequency to transmit to the external terminal device 800 successively. Thus the user can confirm by an external terminal device 800 the status of the latest state.

Incidentally, all of the embodiments described above are described in order to facilitate understanding of the present invention, and are not intended to set forth to limit the present invention. Therefore, the elements disclosed in the embodiments described above are intended to include all design modifications and equivalents belonging to the technical scope of the present invention.

In the present description, a description is given of a monitoring device 100 and vehicle monitoring system 1000 as one aspect of the vehicle monitoring device according to the present invention, the present invention is not limited thereto.

In the present specification, as one aspect of the vehicle monitoring device according to the present invention, description is given by way of example of the monitoring device 100 that includes a control device 10 comprising a CPU11, ROM12, RAM13. The present invention is not limited thereto, however.

In the present specification, as one aspect of the vehicle monitoring device including a camera, a monitoring level determining mechanism or means, monitoring image generation mechanism, and a transmission mechanism, description is give of a monitoring device 100 provided with a camera, monitoring level determination function, monitoring image generating function, and a transmission function. The present invention is not limited thereto, however.

In this specification, as one aspect of a vehicle monitoring system according to the present invention, a description is given of a vehicle monitoring system 1000 that includes a monitoring apparatus 100, a vehicle controller 200, a communication device 400, and an external terminal device 800 as an example, but the present invention is not limited thereto.

Incidentally, all of the embodiments described above are described in order to facilitate understanding of the present invention, and are not intended to set forth to limit the present invention. Therefore, the elements disclosed in the embodiments described above are intended to include all design modifications and equivalents belonging to the technical scope of the present invention.

In the present description, a description is given of a monitoring device 100 and vehicle monitoring system 1000 as one aspect of the vehicle monitoring device according to the present invention, the present invention is not limited thereto.

In the present specification, as one aspect of the vehicle monitoring device according to the present invention, description is given by way of example of the monitoring device 100 that includes a control device 10 comprising a CPU11, ROM12, RAM13. The present invention is not limited thereto, however.

In the present specification, as one aspect of the vehicle monitoring device including a camera, a monitoring level determining mechanism or means, monitoring image generation mechanism, and a transmission mechanism, description is give of a monitoring device 100 provided with a camera, monitoring level determination function, monitoring image generating function, and a transmission function. The present invention is not limited thereto, however.

In this specification, as one aspect of a vehicle monitoring system according to the present invention, a description is given of a vehicle monitoring system 1000 that includes a monitoring apparatus 100, a vehicle controller 200, a communication device 400, and an external terminal device 800 as an example, but the present invention is not limited thereto.

As mentioned above, a security system is known in which upon detection of external stimulus such as detected by a door contact sensor. A camera is employed to capture the surroundings and the image information will be transmitted to an outside mobile phone or the like. However, when a captured image of the camera is sent as it is, i.e., without change, there is a problem of large burden of communication time and cost.

According to the moving body monitoring device pertaining to the present embodiment, when a monitoring target object has been detected, a moving image or video generated based on a captured image including an image or picture corresponding to the monitoring target object.

Accordingly, since the vehicle monitoring system 1000 in the present embodiment transmits a moving image to the external terminal device only when a monitoring target object has been detected in the periphery of the vehicle, the total amount of data of the monitoring image to be transmitted for monitoring the periphery of the vehicle may be reduced. As a result, the transmission cost required for monitoring moving body may be reduced.

Below, description is made with reference to the accompanying drawings of a third embodiment according to the present invention. In the present embodiment, explanation will be made of the vehicle monitoring device according to the present invention as applied to a vehicle monitoring system. Note that the monitoring moving object not limited to vehicles. It is also possible to monitor motorcycles, boats, heavy equipment, and forklifts.

Figure 7:
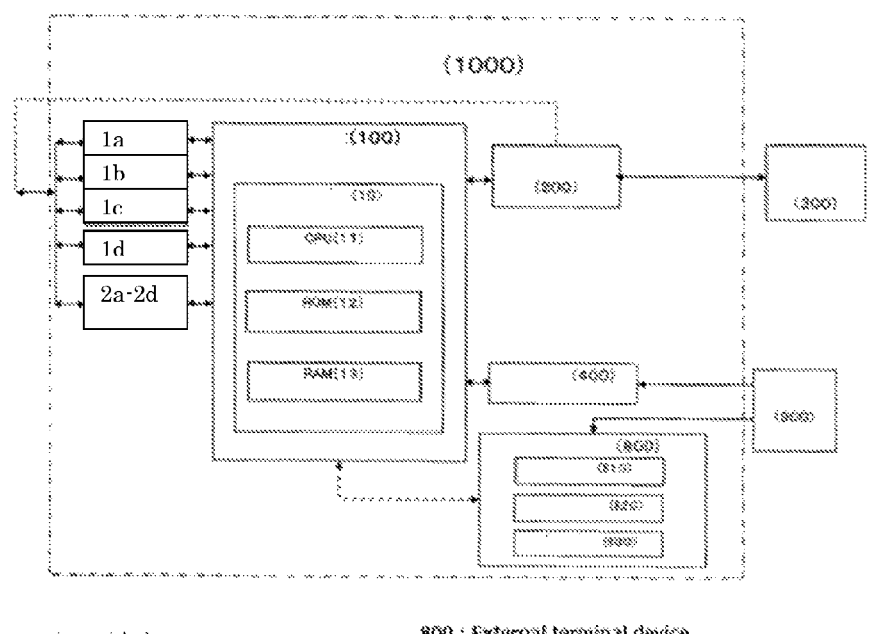
FIG. 7 is a block diagram of a vehicle monitoring system comprising a monitoring system in the present embodiment pertaining to the present invention.

FIG. 7 is a block diagram of a vehicle monitoring system 1000 including a monitoring device 100 according to the present embodiment. As shown in FIG. 7, the vehicle monitoring system 1000 according to the present embodiment includes four cameras 1*a*~1*d* mounted in the vehicle (to be collectively referred to as camera 1 in some cases).

Figure 8:
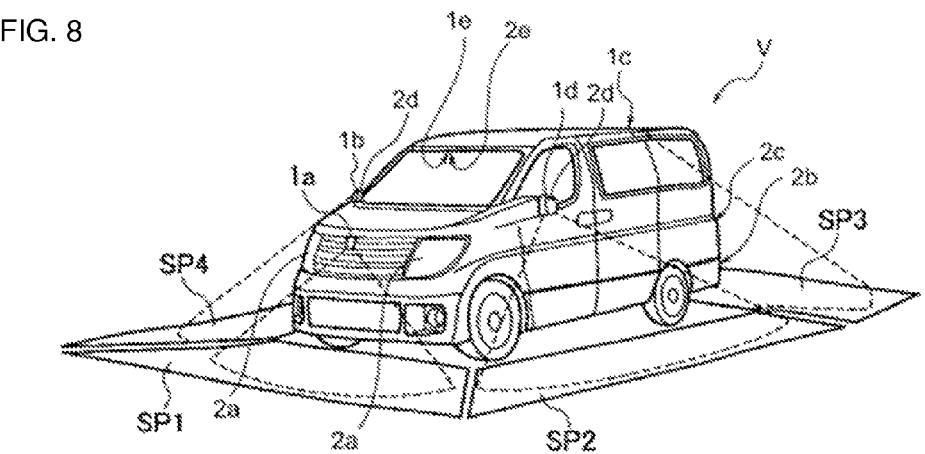
FIG. 8 is a diagram illustrating an installation example of camera.

FIG. 8 is a diagram showing an example of arrangement when cameras 1*a*~1*d* are mounted on the vehicle V. The cameras 1*a* to 1*d* are constructed by using an imaging device such as CCD of (Charge Coupled Devices) and the like, and are respectively disposed at different positions outside the vehicle V to capture each image in the four directions around the vehicle. For example, as shown in FIG. 8, the camera 1*a* that is disposed at a predetermined position in front of the vehicle V such as near a front grill, captures the image of an object or image of the road surface (front view image) in the front area SP1 of the vehicle and in the space in front thereof. The camera 1d installed at a predetermined position of the left side of the vehicle V such as the left side mirror captures the image of an object or road surface present in the left side area SP2 and in a space in its surrounding (left side view image). The camera 1c placed at a predetermined position of the rear of the vehicle V, such as a roof spoiler captures an object or road surface present in the right side area SP4 and in a space in its surrounding (rear view image). The camera 1b disposed at a predetermined position on the right side of the vehicle V, such as the right side mirror captures an image of an object and road surface present camera to photograph an image of an object and the road surface (right side view image) present in the area SP4 at the right side of the vehicle and in a space of the surrounding thereof. The control unit 10 receives each captured image captured by the cameras 1a to 1d, respectively. Note that the number of cameras 1 installed and the installing positions may be suitably determined in according to the size, shape, or setting method of the detection region. The plurality of cameras 1 are assigned an identifier corresponding to each address (arrangement) so that the control unit 10 may identify each of the cameras 1 based on the identifier. Further, the control unit 10 may send an activation command and other commands to a specific camera 1 by the assigned identifier.

As shown in FIG. 8, in the vicinity of the camera 1a~1d, proximity sensors 2a~2d are arranged. The proximity sensors 2a to 2d can detect whether an object is present in a specific area surrounding the vehicle V, or an object surrounding the vehicle is approaching or departing from the vehicle V. The sensor 2a~2d may be formed by ultrasonic sensors, proximity sensors, infrared sensors, or capacitive sensor.

Further, the vehicle monitoring system 1000 according to the present embodiment includes a monitoring device 100, a vehicle controller 200, a communication device 400, and an external terminal device 800. The vehicle monitoring system 1000 may comprise an ignition switch 300 that can exchanges information with the vehicle controller 200. Each of these devices can be connected through a vehicle-mounted LAN CAN (Controller Area Network) and can exchange information each other.

In the vehicle monitoring system 1000 in the present embodiment, the monitoring device 100 can communicate with an external terminal device 800 (computer) equipped with a mobile phone, smartphone or other communication device 810 via the communication device each other. Further, the external terminal device 800 is provided with a communication device 810, an image processing device 820, and a display 830. The communication device 810 obtains the captured image from the side of the vehicle monitoring device 100, while the image processing device 820 executes image processing required for display in accordance with a display mode (moving image/video, streaming, or still image). The display 830 displays the captured image. A user holding the external terminal device 800 may confirm the captured image of the vehicle transmitted from the vehicle monitoring device using the external terminal device 800.

Figure 9:
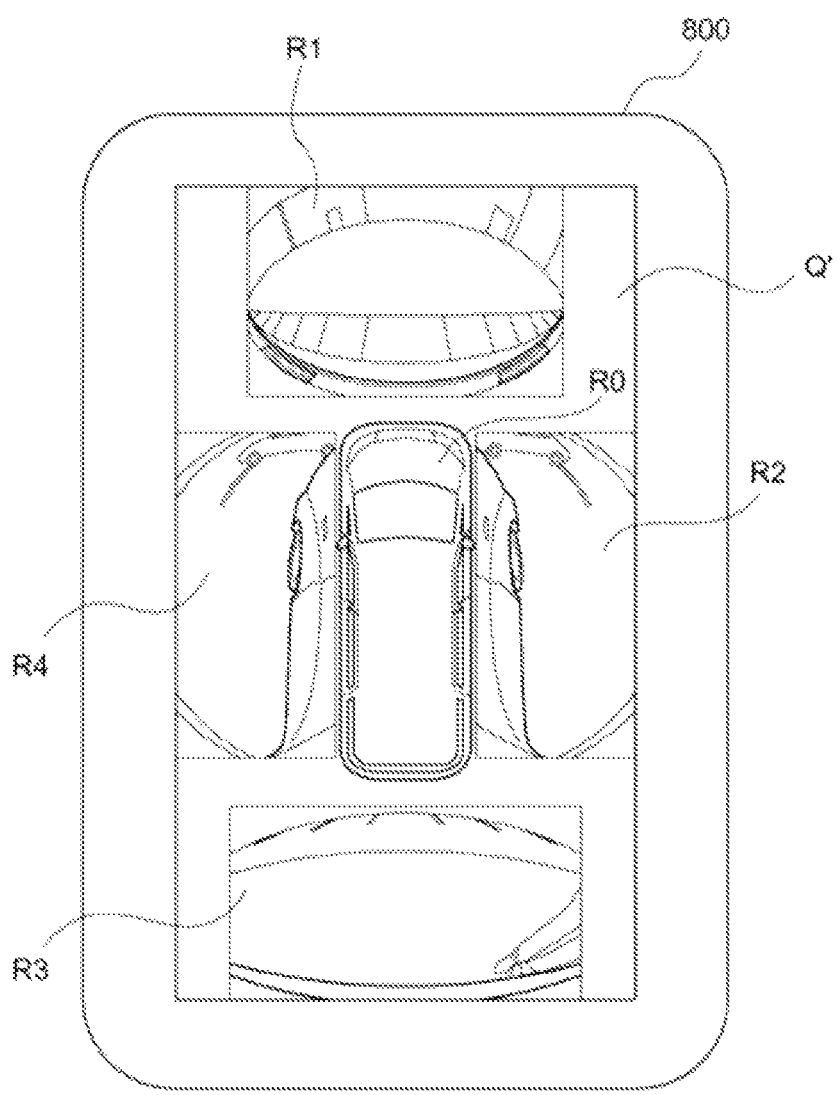
FIG. 9 is a diagram showing a display example of a monitoring image in the external terminal device according to a third embodiment.

FIG. 9 is a diagram showing a display example of a monitoring or surveillance image Q' for display on an external terminal device 800. The monitoring image Q' for the display shown in FIG. 9 includes a monitoring image R1 based on the image captured by the camera 1a, a monitoring image R2 based on the image captured by the camera 1b, a monitoring image R3 based on the image captured by the camera 1c, a monitoring image R4 based on the image captured the camera 1d, and a virtual vehicle model image R0 when viewed from the perspective of above the vehicle V. The monitoring images R1 to R4 may be a moving image showing a continuous change in state, or may be a still image showing a transient state. Further, a portion of the monitoring images R1 to R4 may be displayed as a moving image or video while the other portion in still image. Thorough this monitoring image Q of such as this, the user is able to be away in a location that is spaced from the vehicle V, and to monitor the status of the surroundings of the vehicle V.

As shown in a block diagram in FIG. 7, the controller or control unit 10 of the monitoring device 100 pertaining to present embodiment is provided with a ROM 12 that stores programs for determining a monitoring level, and generating a monitoring image in a display mode in accordance with the monitoring level to transmit to the external terminal device 800, a CPU (Central Processing Unit) that functions as the monitoring device 100 by executing the programs stored in the ROM 12, and a RAM (Random Access Memory) 13 that functions as an accessible storage unit.

The controller 10 of the monitoring device 100 pertaining to the present embodiment may perform each function through collaboration of a monitoring image generating function, software to perform the transmission function and the hardware described above. In the present embodiment, an example of mode is described in which the controller 10 transmits each control instruction. However, the controller 10 in the present embodiment may control the camera 1 and the communication device 400 via a vehicle controller 200, as well.

Though not particularly limited, the monitoring device 100 in the present embodiment can start a monitoring process when an OFF signal of an engine is input to the ignition switch 300 and an electronic key having a communication function of the vehicle V is not present in the vicinity of the vehicle V (i.e., the user carrying the electronic key is remote from the vehicle), or when a request command for transmission of the monitoring image from the external terminal device 800 of the user has been received. Incidentally, the trigger of the monitoring process is not limited thereto, but the monitoring device 100 may start the monitoring process such as, when a sonar (not shown) detects an object around the vehicle V, when the door contact sensor detects the abnormality such as the contact to door, when the tilt sensor detects an abnormal inclination of the vehicle (such as ingress), when an abnormality detection sensor detects the abnormality such as forcible opening of door or cracking of windows, when a monitoring target object is detected from the image captured by the camera 1a, and when a switch (not shown) for the monitoring device 100 has received an input, etc.

Further, the monitoring device 100 pertaining to the third embodiment is provided with an image processing control unit (IPCU). Using the image processing control unit, the control device 10 analyses the captured images of each camera 1, extracts an image corresponding to an object from data of captured image, and determines based on a displacement amount of the extracted image whether or not the detected object is a moving object and, if yes, calculates the displacement amount. The control unit 10 may calculate a steady change in position or a change in position over time of the object based on the change of the captured image. Based on this steady change in the position of the object, the control unit 10 may detect the monitoring target object. For example, the control device 10 detects, when a moving object detected from the captured image is staying in the vicinity of the vehicle V for a predetermined time or more, the object as a monitoring target object and can store the captured image including the monitoring target object after detection along with time information. The image processing may use a technique known in the field at the time of the present application.

Hereinafter, description will be given of each function realized by the monitoring device 100 pertaining to the present embodiment according to the present invention.

First, description is given of a monitoring image generation function of the monitoring device 100 pertaining to the third embodiment. The control device 10 of the monitoring device 100 pertaining to the present embodiment determines from the captured image picked up by the camera 1a~1d whether or not a monitoring target object is present in the periphery of the moving body such as a vehicle using the Image Processing Control Unit (IPCU). When the presence of the monitoring target object is detected, in accordance with the captured image including the image corresponding to the monitoring target object, a moving image or video indicating the change in state of periphery of the moving body such as vehicle is generated as a monitoring image. The moving image or video in the present embodiment is intended to mean image information in which a plurality of images is successively displayed within a unit time so that the change in state of the monitoring area may be indicated.

When the presence of a monitoring target object has been detected, the control device 10 stores a plurality of captured images picked up during a predetermined time T upon detection of the monitoring target object with monitored time (captured time) associated. The monitoring device 100, when required, compresses and stores the monitoring image. The monitoring image may be stored as a single moving image file, or may be stored in the possible form for transfer and playback in a streaming manner.

Further, when a moving speed (moving amount per unit time) of the monitoring target object, which is calculated on the basis of the captured image, is smaller than the predetermined value, the monitoring device 100 pertaining to the third embodiment, generates a monitoring image by reducing a frame rate representing the number of images contained per unit time. In other words, when the moving speed of the monitoring target object is low, the frame rate is decreased depending on the movement. Thus, when the moving speed of the monitoring target object is low, by withholding to send moving images at excessive frame rate, the data amount of moving images to be transmitted during monitoring operation may be decreased. On the other hand, when the moving speed of the monitoring target object exceeds a predetermined value, in accordance with the moving speed, a moving image or video will be sent depending on the speed employed a moving image is set with a relatively large frame rate to generate the monitoring image illustrating the monitoring target object.

Further, when the monitoring target object is not detected around the moving object such as a vehicle, the control device 10 of the monitoring device 100 according to the present embodiment produces a still image indicating a temporary state around the moving body such as vehicle. The control device 10 may compress and stores the still image for monitoring image that has been produced as needed.

The following describes the procedure of the vehicle monitoring system 1000 in the present embodiment according to the present invention. FIG. 10 is a flowchart showing a control procedure of the vehicle monitoring system 1000 in the third embodiment.

First, description is given of the operation of the monitoring device 100. In step 10, the controller or control device 10 of the monitoring device 100 in the third embodiment determines whether or not it is a monitoring start time. In the present embodiment, in a case where a vehicle key is not present nearby with engine OFF, the time at which a request command for a monitoring image from the terminal unit 800 of user's possession has been received is recognized as the monitoring start time to start the monitoring procedure. The monitoring start timing is not limited. The monitoring procedure may be started at the time when a door contact sensor of the vehicle, an inclination sensor, and a vehicle abnormality detection sensor and the like detects abnormality.

In step 20, the monitoring device allows the cameras 1a to 1d to start to capture respective area or region of capture to acquire each captured image.

In step 30 that follows, the monitoring device 100 determines whether or not the captured image is the first one from the camera 1. When the acquired, captured image is the first captured image immediately after a capturing start, control proceeds to step 40 to store the first captured image as a reference monitoring image G0 to transmit to the external terminal device 800 and waits for the next captured image. The reference monitoring image G0 is intended to mean a captured image that is acquired at a reference monitoring time t0 that represents a reference when the surroundings of the vehicle V is monitored. In the present embodiment, the first captured image is set as the reference monitoring image G0. However, the present invention is not limited thereto. The reference monitoring image G0 may be set to the captured image at a reference monitoring time t0 that meets a prescribed condition.

In contrast, when the captured image acquired in step 30 is not the first captured image, the process proceeds to step 50 and the monitoring device 100 determines whether or not a monitoring target object is present based on the change amount of the image data of the captured image. When determining the presence of the monitoring target object, the captured image currently acquired may be compared with the reference monitoring image G0, or the captured image currently acquired may be compared with the captured image previously acquired.

When the monitoring target object is detected, the process proceeds to step 60 where the monitoring device 100 generates a moving image indicating the change of state in the periphery of the vehicle V continuously as a monitoring image based on the captured image including an image corresponding the monitoring target object. In other words, the monitoring image represented by the moving image or video includes the image of the monitored object. The monitoring device 100 in the present embodiment identifies the camera 1 that has captured an image in which the monitoring target object is detected and can generate the monitoring image based on the captured image of that camera 1a to 1d.

After generating the monitoring image, although process proceeds to step 80, prior to perform the process in step 80, the processes in steps 61 and 62 may be carried out. Specifically, in step 61, the monitoring device 100 calculates a moving speed of the monitoring target object based on the captured image, and proceeds to step 62 to reduce the frame rate of the monitoring image when the moving speed of the monitoring target object is below a predetermined value. The monitoring device 100 may define the relationship in which the frame rate decreases in accordance with decrease in moving speed of the monitoring target object in advance, and may obtain the frame rate based on the moving speed of the monitoring target object by referring to this relationship.

On the other hand, when the moving speed of the monitoring target object is equal to or less than the predetermined value, control proceeds to step 80 without changing the frame rate.

On the other hand, when a monitoring target object is not detected in step 50, the process proceeds to step 70 to generate a still image as a monitoring image showing a temporary state in the vicinity of the vehicle V.

In a subsequent step 80, the moving image or still image produced as monitoring image are transmitted to the external terminal device 800. Subsequently, control proceeds to step 90 where control waits for end of the monitoring process (the time at which the electronic key of user possession is close to a communicable distance, the occupant has turned engine ON, etc.). When completed, control returns to step 10 to wait for the next monitoring start timing. Otherwise, control returns to step 30 to wait for the acquisition of the captured image next.

Subsequently, a description will be given of a control method of an external terminal device 800. The external terminal device is a computer having elements corresponding CPU, RAM, and ROM and further has a communication unit 810, an image processing unit 820, and a display 830. As shown in steps 110 to 130, the communication unit 810 receives a monitoring image (step 110), and sends the received monitoring image to the image processing unit 820. The image processing unit 820 in turn is provided with an image processing control unit (IPCU) and can performs image processing of the monitoring image received. (step 120). The received monitoring images are respectively provided with an identifier that identifies the camera that has captured the respective image, and depending on the identifier the image processing unit 820 may allot each monitoring image to each display area. Specifically, the image processing unit 820 allots each pixel of the monitoring image received to each element of the display area of the display to display, for example, the monitoring images R1 to R4 on the display 830 as shown in FIG. 9.

According to the monitoring device 100 and the vehicle monitoring system 1000, since only when a monitoring target object has been received in the periphery of the own vehicle, the monitoring image in a moving image or video is transmitted to the external terminal, the total amount of data for the monitoring image to be transmitted for monitoring the periphery of the vehicle may be reduced. Consequently, the transmission cost necessary for monitoring vehicle and other moving body can be reduced.

Further, according to the monitoring device and the vehicle monitoring system 1000 in the third embodiment, since when the monitoring target object is not detected, a still image of small amount of data will be transmitted, so that, the user present in a remote position from the vehicle can confirm a temporary state in the vicinity of the vehicle when the possibility is high that no hazardous situation would arise with the vehicle.

Thus, while suppressing the amount of transmission data of the monitoring image, the surroundings of the vehicle can be monitored through image.

Furthermore, according to the monitoring device and the vehicle monitoring system 1000 in a third embodiment according to the present invention, when the moving speed of the monitoring target object is smaller than a predetermined value, by reducing the frame rate according to the moving speed of the monitoring target object, it is possible to capture the motion (state change) of the monitoring target object while creating a monitoring image having a small amount of data to reduce the amount of data transmitted in the monitoring process.

A description will now be given below of a monitoring device 100 and a vehicle monitoring system 1000 in a fourth embodiment according to the present invention with reference to FIGS. 11 to 16. The monitoring device 100 and the vehicle monitoring system 1000 is different from the third embodiment in the generating method of monitoring image and the monitoring image created. However, the configuration shown in FIG. 7 and the basic control procedure shown in FIG. 10 are common. To avoid duplicate description, the description will focus on the differences in the following descriptions, and the description of other points in the third embodiment is incorporated.

FIG. 11 is a flowchart showing a control procedure of the monitoring apparatus 100 and the vehicle monitoring system 1000 in the fourth embodiment according to the present invention.

Figure 12A:
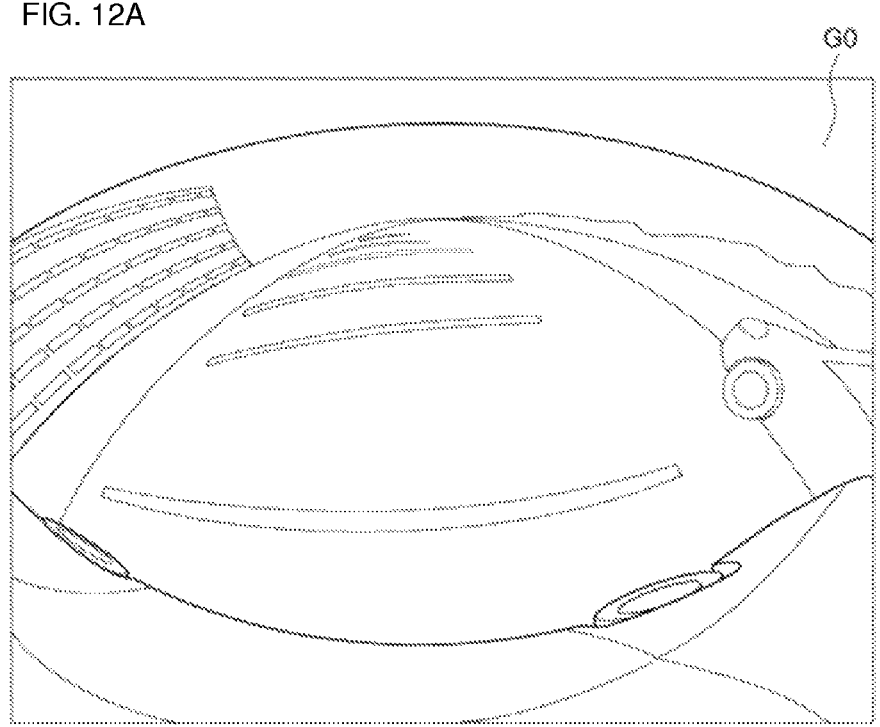
FIG. 12A is a diagram showing an example of the reference monitoring image at a reference monitoring timing in a monitoring system according to the fourth embodiment.

The monitoring apparatus 100 performs the same control procedure as well as process as those in the third embodiment shown in FIG. 10, and transmits to the external terminal device 800 a reference monitoring image G0 in the same manner as in Step 40. The external monitor terminal device 800 receives the reference monitoring image G0 (step 210) and stores, the reference monitoring image G0 (step 220). FIG. 12A is a diagram showing an example of the reference monitoring image G0.

In this flowchart, description will be given of the process that is capable of generalization at the monitoring timing tK. In step 110, the monitoring device 100 starts to generate a monitoring image at the monitoring timing tK. Note that the monitoring timing tK is set at one or more timings positioned after the reference monitoring timing t0 (image capturing timing of the reference monitoring image G0) serving as the reference for monitoring the periphery of the vehicle V. The monitoring timing tK may be a timing that comes around at predetermined intervals, or may be a timing that meets a predetermined condition, such as when a monitoring command input from an external terminal device 800 of the user has been received.

Figure 12B:
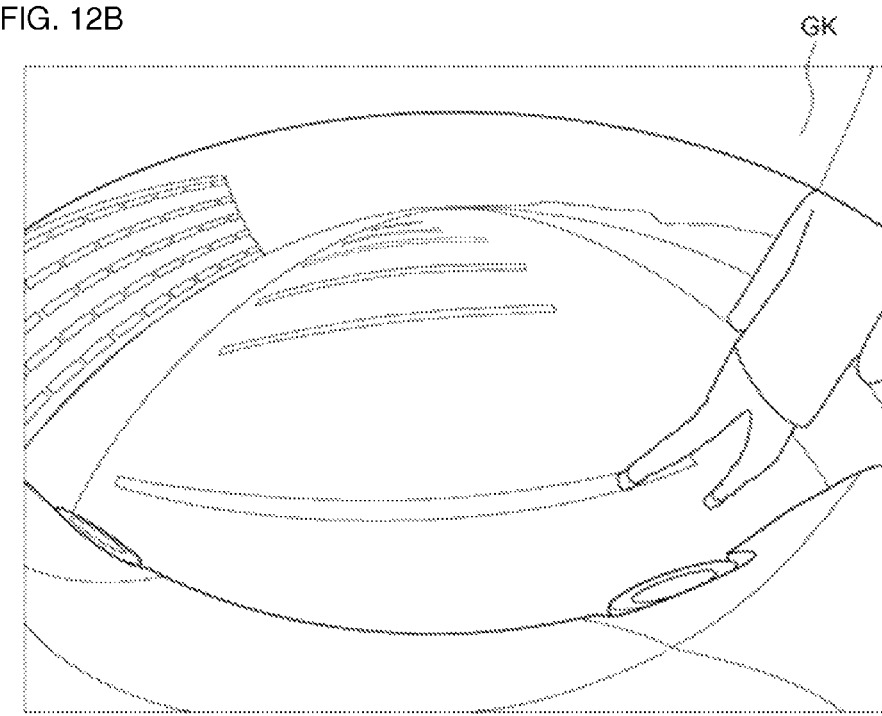
FIG. 12B is a diagram showing an example of a comparison image at the monitoring time in the fourth embodiment.

In step 120, the monitoring device 100 acquires a comparison image captured by the camera 1 in the monitoring time tK. FIG. 12B is a view showing an example of a comparison image GK. When compared to the reference monitoring image G0 in FIG. 12A, an image corresponding to the object appears on the right side of the comparison image GK.

Figure 13:
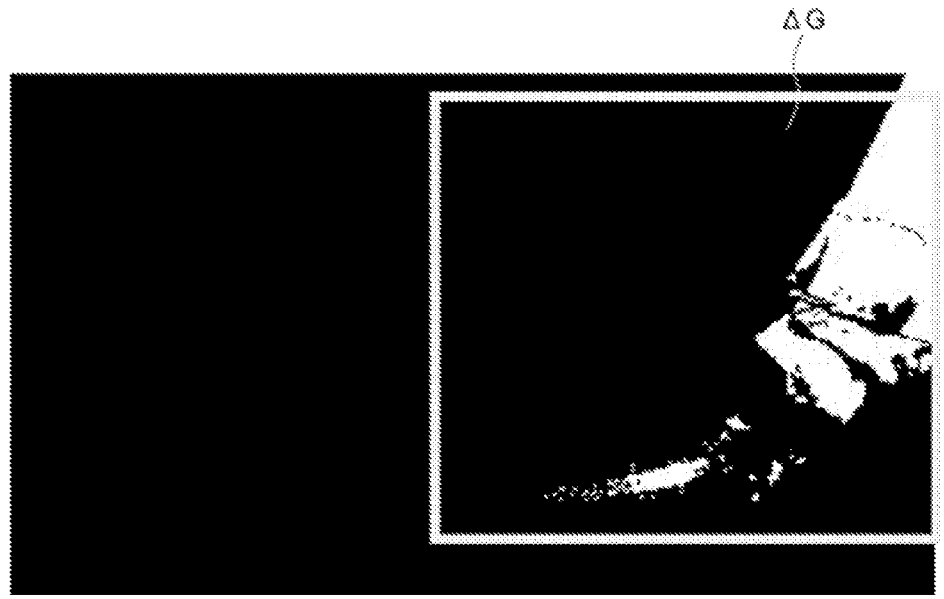
FIG. 13 is a diagram showing an example of a difference image between the reference monitoring image and the comparison image in the monitoring system in the fourth embodiment.

In step 130 that follows, the monitoring device 100 compares the reference monitor image G0 picked at the reference monitor timing t0 to the comparison images taken at the one or more time points later than the reference monitor timing t0, and obtains a difference image that responds to changes in the image data of the images. Since there is no change in the background image while the vehicle is parked with engine being stopped, by taking the difference between the reference monitoring image G0 and comparison images GK, a difference image ΔG may be extracted that corresponds to a change in image from the reference monitoring image G0 at the monitoring timing tK. FIG. 13 is a diagram showing an example of the difference image ΔG. In FIG. 13, an area in a white frame is defined as a difference image ΔG. Alternatively, the whole image shown in FIG. 13 may be defined as the difference image ΔG, and an identifier may be affixed for a region other than the difference image ΔG to indicate to that effect.

Figure 14:
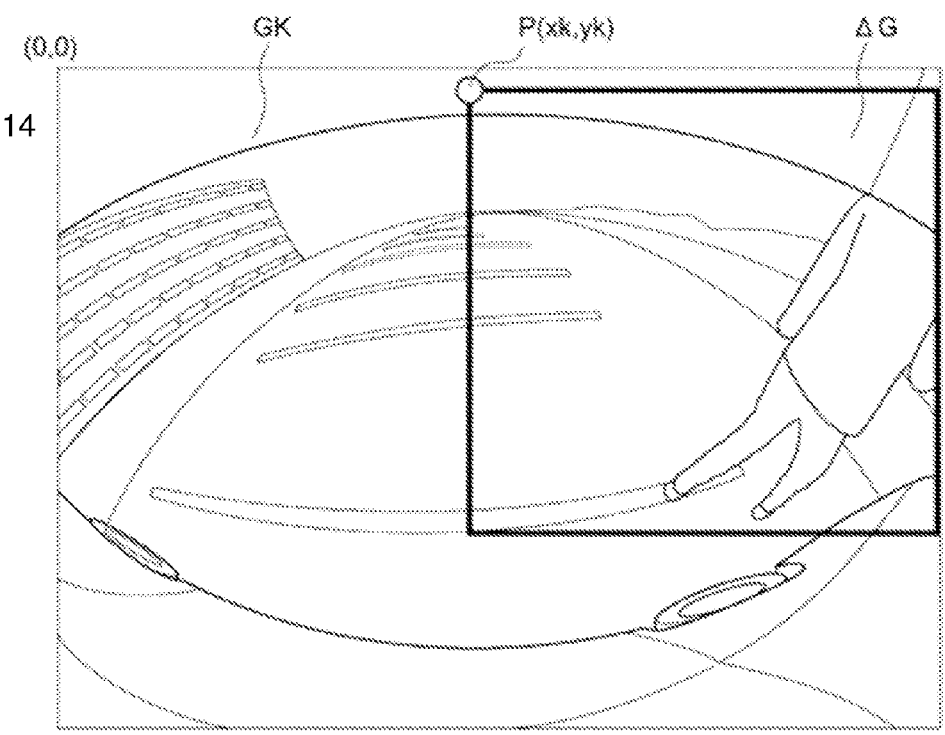
FIG. 14 is a diagram for explaining the coordinate values of the difference image shown in FIG. 13.

The monitoring device 100 obtains the coordinates (xk, yk) of the vertex P of the difference image ΔG as shown in FIG. 14, which can define the position with respect to comparison images GK. Because both the reference monitoring image G0 and the comparison image GK are defined by the same coordinates, it is possible to determine the position of the difference image ΔG with respect to the reference monitor image G0 by the coordinates (xk, yk).

Finally, in step 140, the monitoring device 100 transmits to the external terminal device 800 the monitoring image Q based on the difference image ΔG. Transmission of the monitoring image Q is performed at a timing later than the transmission timing of the reference monitoring image G0. In the monitoring image, when the position of the difference image ΔG with respect to the reference monitoring image G0 that was transmitted in step 40 is unknown, the position information P (xk, yk) of the difference image ΔG may be included in the monitoring image.

Figure 15:
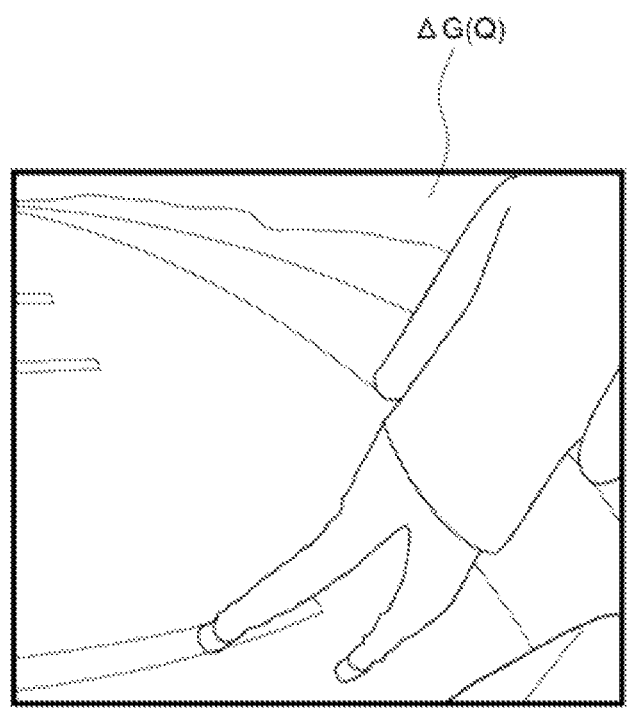
FIG. 15 is a diagram showing an example of the monitoring image transmitted to the outside in the monitoring system in the fourth embodiment.

FIG. 15 is a diagram showing an example of the monitoring image to be transmitted. As shown in FIG. 15, in the present embodiment, the monitoring image Q transmitted by the monitoring device 100 is image data corresponding to the difference image ΔG. Thus, compared to the monitoring image transmitted in the third embodiment (corresponding to FIG. 12B), the amount of data may be reduced significantly.

In step 140, the monitoring apparatus 100 may obtain the monitoring image with a first identifier attached to an invariable region other than the region corresponding to the difference image ΔG out of the comparison image GK acquired at the monitoring timing. The first identifier is intended to be information for distinguishing the invariable region common to both the reference monitoring image G0 and the image data. In other words, the invariable region attached with the first identifier may be treated as a background portion having no change from the above mentioned reference monitoring image G0 and can utilize the image data of the reference monitoring image G0 previously transmitted.

Then, description is give of the process on the side of the external terminal device 800. In step 230, the external terminal device 800 receives the monitoring image in which each information is attached.

Figure 16:
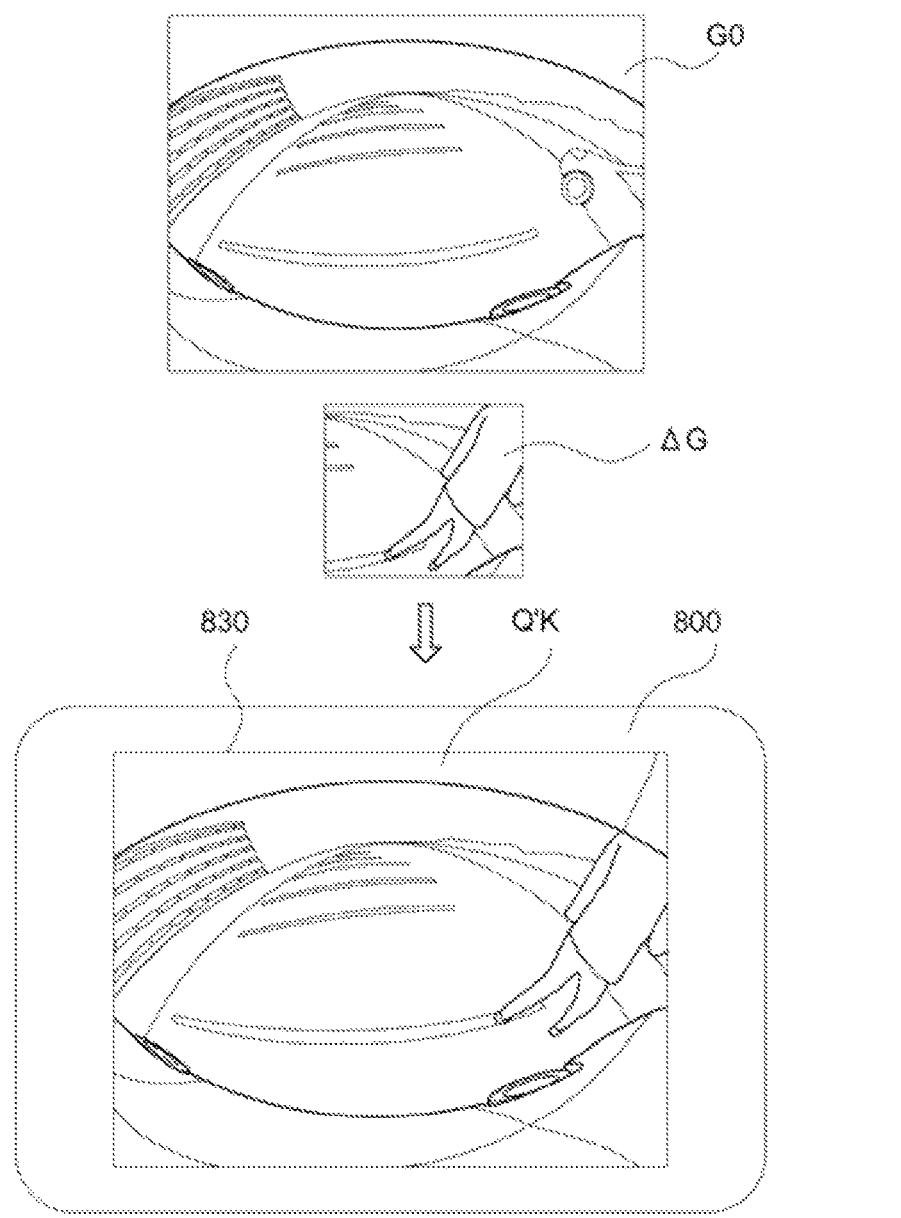
FIG. 16 is diagram showing a method of generating a monitoring image for display in the external terminal device in the fourth embodiment.

In subsequent step 240, the external terminal device 800 superimposes the difference image ΔG on the monitored image G0, and generates a monitoring image Q' for display in the monitoring time tK. FIG. 16 is a diagram for explaining a method for generating monitoring image in the monitoring time tK. As shown in FIG. 16, the external terminal device 800 reads the reference monitoring image G0 which has been received and stored previously at step 220, and superimposes the difference image ΔG received in step 230 to the reference monitoring image G0 to generate the monitoring image Q'K for display in the monitor timing tK. Note that the reference monitor image G0 shown in FIG. 16 is common to the reference monitoring image G0 shown in FIG. 12A, while the difference image ΔG is common to the difference image ΔG shown in FIG. 13. Note that, when the information about the difference image ΔG includes an address of pixels, based on the address, the difference image ΔG will be pasted in a corresponding position in the reference monitoring image. G0. When the paste position cannot be identified from the information of the difference image ΔG, by obtaining the position information P (xk, yk) of the difference image ΔG shown in FIG. 14, and the difference image ΔG can be pasted at positions corresponding to the reference monitoring image G0.

The lower diagram in FIG. 16 shows an example in which the monitoring image Q'K generated for display is displayed on the display 830. As shown in the figure, the monitoring image Q'K with the reference monitoring image G0 superimposed with the difference image ΔG is substantially common (substantially equivalent) to the comparison images GK shown in FIG. 12B picked up in the monitoring time tK.

As described above, according to the monitoring device 100 and the vehicle monitoring system 1000 in the fourth embodiment according to the present invention, the same operational effects are performed the third embodiment, and in the monitoring time tK, only the difference image ΔG with respect to the reference monitoring image G0 is sent to the external terminal device 800. Therefore, it is possible to reduce the total amount of data of the monitoring image to be transmitted to monitor the surroundings of the vehicle V. As a result, it is possible to reduce the communication cost required for monitoring the vehicle V.

Further, according to the vehicle monitoring system 1000 in the present embodiment, when generating the monitoring image Q in the monitoring time tK, only the difference image ΔG corresponding to the changed area that has changed from the reference monitoring image G0 is newly sent or received, and the portion corresponding to the unchanged region that has not changed compared to the reference monitoring image G0, the reference monitoring image G0 already sent will be utilized. Thus, compared to the case in which the comparison image GK in the monitoring time tK would be sent as it is, the amount of transmission data will be reduced without deteriorating the quality of image of the monitoring image Q' to be displayed. As a result, the user can monitor the vehicle by a clear monitoring image A' while saving the communication cost.

A description will now be given below of a monitoring device 100 and a vehicle monitoring system 1000 in a fifth embodiment according to the present invention with reference to FIGS. 17 to 19. The monitoring device 100 and the vehicle monitoring system 1000 is different from the third and fourth embodiments in the generating method of monitoring image and the monitoring image created. However, the configuration shown in FIG. 7 and the basic control procedure shown in FIG. 10 are common. To avoid duplicate description, the description will focus on the differences in the following descriptions, and the description of other points in the third and fourth embodiments is incorporated.

FIG. 17 is a flowchart showing a control procedure of the monitoring apparatus 100 and the vehicle monitoring system 1000 in the fifth embodiment according to the present invention.

The monitoring apparatus 100 performs the same control procedure as well as process as those in the third embodiment shown in FIG. 10, and transmits to the external terminal device 800 a reference monitoring image G0 in the same manner as in Step 40. The external monitor terminal device 800 receives the reference monitoring image G0 (step 410) and stores, the reference monitoring image G0 (step 420).

In the flowchart shown in FIG. 17, an example process in the monitoring time tK (K is a natural number, the same below) is described, which is capable of generalization.

In step 310, if it is a monitor timing tK, the monitoring device 100 starts the generation of monitoring image of the present embodiment. This monitoring timing tK is the arbitrary timing of multiple continuous nature that comes around in a predetermined cycle after a reference monitor timing t0 (capturing timing of the reference monitor image G0) that sets a reference for monitoring the surroundings of the vehicle V. Turning now to each monitor timing, as shown in FIG. 18, in the time axis t, after the reference monitor timing t0, the monitor timing t(K−1) follows and the monitor timing tK continues. The monitor timing t(K−1) represents a monitoring timing immediately before the monitor timing tK. Further, between the reference monitor timing t0 and the monitor timing t(K−1), a plurality of monitor timings t(1) to t(K−2) are set. The imaging processing by the camera 1 runs at each monitor timing, and the monitoring device 100 stores these monitoring images.

Incidentally, the reference monitoring image G0 in FIG. 18 is common to the reference monitoring image G0 shown in FIG. 12A, and the Kth comparison image GK in FIG. 18 is common with the comparison image GK shown in FIG. 12B.

In step 320, the monitoring device 100 in the present embodiment compares the K-th comparison image GK captured in the K-th monitor timing after the reference timing t0 (K is natural numbers, the same below) with the reference image G0 to extract the Kth difference image ΔG (0−K). FIG. 18 illustrates the K-th difference image ΔG.

Next, in step 330, the monitoring device 100 compares the K-th comparison image GK captured in the K-th monitor timing after the reference timing t0 (K is natural numbers, the same below) with the (K−1)th comparison image G(K−1) captured in the (K−1) time t(K−1), immediately before the Kth monitor timing tK to extract a (K−1) difference image ΔG(−1). The K-th difference image ΔG (−1) is shown in FIG. 18.

In subsequent step 330, the monitoring device 100 divides the K-th difference image ΔG(0−K) into three regions and attaches an identifier to each. Specifically, (1) a first identifier is attached to the image data of invariable region having no difference over the reference monitoring image G0; (2) a second identifier is attached to the image data of duplicate change region included in the (K−1)th and K difference values; and (3) a third identifier is attached to the image data of immediate change region included in the (K−1)th difference image ΔG (−1) among the K-th difference image ΔG (0−K).

Though not limited to, the monitoring apparatus 100 in the present embodiment attaches the third identifier as the immediate or most recent change region included only in the (K−1)-th difference image ΔG (−1) to the logical product (duplicate region) or the (K−1)-th difference image ΔG(−1), attaches the second identifier to the region with while in the K-th difference image ΔG(0−K) while black in the (K−1) difference image ΔG (−1), i.e., the region of remainder obtainable by subtracting the (K−1) difference image ΔG (−1) from the K-th difference image ΔG (0−K), and attaches the first identifier to the remaining region where neither the second nor the third identifier is attached.
The method for affixing the identifiers is not limited in particular.

Further, the image to which the second identifier is attached appears in the comparison image GK. It also appears in the comparison image G(K−1) in the monitor time tK−1. Therefore, upon monitoring the surroundings of the vehicle V, with respect to the image of the region where the second identifier is attached, the pixel value of the comparison image G (K−1) in the monitor time tK−1 can be used as it is as the monitoring image.

Further, the image of the region to which the first identifier is attached represents an invariable region with no change in the monitor time tK when the reference monitoring timing t0 is set as reference. In particular, when the vehicle is parked, the background image does not undergo change. Therefore, upon monitoring the surroundings of the vehicle V, the image of the region to which first identifier is attached, the pixel value of the reference monitoring image G0 in the reference monitor timing t0 can be utilized as it is as a monitoring image.

Though not particularly limited, each identifier is formed in color information. For example, in the present embodiment, the pixel to which a first identifier utilizing the reference monitoring image G0 is attached is given the color information of "0" (zero: black value), the pixel to which the second identifier utilizing the (K−1)-th comparison image G(K−1) is given the color information of "1! (white value), and the pixel to which the third identifier utilizing the K-th comparison image GK is given "0.5" (grey value), respectively.

In FIG. 18, a replacement image H is shown in which the color information of black, white, and grey is attached as the first to third identifiers to the K-th difference image ΔG (0−K).

Then, in the subsequent step 340, the monitoring device 100 of the present embodiment replaces the image data of the image region to which the third identifier (grey value) of the K-th difference image ΔG of (0−K) with the K-th comparison image GK corresponding to the image area. The K-th monitoring image QK where the image of the K-th comparison image GK is pasted to the region of the third identifier (grey value) of the replacement image H is shown in FIG. 18.

Incidentally, the image of the region to which the third identifier is attached appears only in the comparison image GK picked in the monitoring time tK, since it is the image corresponding to the state change in the range between tK−1 and tK. Therefore, upon monitoring the surroundings of the vehicle V, the image of the region to which the third identifier is attached, the pixel values of the comparison image GK in the monitoring time tK can be utilized as it is as a monitoring image.

Finally, in step 360, the monitoring device 100 transmits to the external terminal device 800 the K-th monitoring image QK in which first and second identifiers are included and the region to which the third identifier is attached is replaced with the image data of the K-th comparison image GK together with the coordinates of the vertex P (xk, yk) which specify the position of this K-th monitoring image QK.

Then, description is give of the process on the side of the external terminal device 800. The process described below relates to the process pertaining at the K-th monitoring timing. However, as shown in step 430, the first to the (K−1)-th monitoring images generated at the previous first to the (K−1) monitoring timings, respectively, are stored in the external terminal device 800.

In step 440 shown in FIG. 17, the external terminal apparatus 800 receives the K-th monitoring image QK including the image data of the K-th comparison image GK corresponding to the region to which the third identifier is attached, the first identifier, and the second identifier.

In step 450 that follows, the external terminal device 800 reads out the reference monitoring image G0, which is stored in step 420, and the (K−1)-th monitoring image Q' (K−1) generated at step 430 for display. The (K−1)-th monitoring image Q' (K−1) may be acquired in the same manner as the generation process od the K-th monitoring image QK described above based on the reference monitoring image G0, the (K−2)-th monitoring image Q' (K−2), and the (k−1)-th monitoring image Q'(K−1).

In step 460, based on the reference monitoring image G0, the (K−1)-th monitoring image Q(K−1), and the K-th monitoring image QK, the external terminal device 800 generates a monitoring image QK at the monitor timing tK.

FIG. 19 is a diagram for explaining a method for generating the monitoring image Q'K for display in the monitoring time tK according to the process of step 460. As shown in FIG. 19, the external terminal apparatus 800 reads out the reference monitoring image G0 received and stored in the previous step 420 and the (K−1)-th monitoring image Q(K−1) generated and stored for display in previous step 430 in like manner.

In addition, the external terminal device 800 replaces, out of the K-th monitoring image QK received in step 440, the image data of the image region to which the first identifier is attached with the image data of the reference monitoring image G0 and replaces the image data of the image region to which the second identifier is attached with the image data of the (K−1)-th monitoring image A(K−1) to thereby create the K-th monitoring image QK for display. Incidentally, the image data of the pixel region in which the third identifier is attached is already attached with the image data of the K-th comparison image GK.

Incidentally, the reference monitoring image G0 shown in FIG. 19 is common to the reference monitoring image G0 shown in FIG. 18, and the (K−1)-th monitoring image Q(K−1) shown in FIG. 19 is substantially common (substantially equivalent) to the (K-1-th comparison image G(K−1) shown in FIG. 18. Note that, when the address of the pixel is included in the K-th monitoring image QK, based on that address, the image data of the K-th monitoring image QK is pasted at the corresponding position in the reference monitoring image G0. When the paste position cannot be identified from the information of K-th monitoring image QK, by acquiring the position information P (xk, yk) of the K-th monitoring image QK shown in FIG. 18, the image data of the K-th monitoring image QK (the image data of the K-th comparison image GK) may be pasted at the corresponding position in the reference monitoring image G0.

The view on the right side of FIG. 19 shows an example in which the monitoring image Q' for display at the monitor timing tK is displayed on the display 830. As shown in the figure, the K-th monitoring image Q'K for display where each identifier of the K-th monitoring image QK is replaced with the image data of the reference monitoring image G0 and the (K−1)-th monitoring image Q(K−1) is substantially common (substantially equivalent) to the K-th comparison image GK shown in FIG. 18 captured in the monitor time tK.

As composed and operable above, the monitoring device 100 and the vehicle monitoring system 1000 pertaining to the fifth embodiment according to the present invention, in addition to the similar effects obtained by the third embodiment, the following effects are achieved.

According to the monitoring device 100 and the vehicle monitoring system 1000 in the present embodiment, by utilizing the image data of reference monitoring image GO previously transmitted and the (K−1) monitoring image Q' (K−1) for display at the (K−1)-th monitor timing created on the side of the external terminal device 800, it is sufficient that the image data for the K-th comparison image GK is transmitted only with respect to the difference between the K-th comparison image GK and the previous (K−1)-th comparison image G(K−1) at a certain monitoring timing tK. Therefore, it is possible to reduce the total amount of data of the monitoring image to be transmitted in order to monitor the surroundings of the vehicle V. As a result, it is possible to reduce the communication cost required for monitoring the vehicle V.

Further, by using an identifier to specify a pixel area using the reference monitoring image G0 and the (K−1)-th monitoring image Q(K−1), it is possible to reduce the total amount of data of the monitoring image to monitor the surroundings of the vehicle V. In particular, it is possible, by using color information (black value, white value, gray value) as an identifier, thereby increasing the compression ratio of the data. Especially, it is possible to further reduce the total amount of data of the monitoring image to be transmitted.

Furthermore, according to the vehicle monitoring system 1000 in the present embodiment, when generating the monitoring image Q in the monitoring time tK, only the differential image over the previous (K−1)-th comparison image G(K−1) immediately before is newly sent or received. With a portion corresponding to an invariable region of no change compared to the reference monitoring image G0, the reference monitoring image G0 previously sent is utilized. Further, with respect to a portion corresponding to a maintained region of no change compared to the previous (K−1)-th comparison image G(K−1), the (K−1)th comparison image Q(K−1) previously generated is used as it is. Therefore, compared to the case where the comparison image GK at the monitoring timing is set as it is, the transmission data may be reduced without decreasing the image quality of the monitoring image Q' to be displayed. As a result, the user can monitor the vehicle through a clear monitoring image Q' while saving communication cost required for the remote monitoring of vehicles V.

Incidentally, all of the embodiments described above are described in order to facilitate understanding of the present invention, and are not intended to set forth to limit the present invention. Therefore, the elements disclosed in the embodiments described above are intended to include all design modifications and equivalents belonging to the technical scope of the present invention.

In the present description, a description is given of a monitoring device 100 and vehicle monitoring system 1000 as one aspect of the vehicle monitoring device according to the present invention, the present invention is not limited thereto.

In the present specification, as one aspect of the vehicle monitoring device according to the present invention, description is given by way of example of the monitoring device 100 that includes a control device 10 comprising a CPU11, ROM12, RAM13. The present invention is not limited thereto, however.

In the present specification, as one aspect of the vehicle monitoring device including a camera, a monitoring level determining mechanism, and a transmission mechanism, description is give of a monitoring device 100. The present invention is not limited thereto, however.

In this specification, as one aspect of a vehicle monitoring system according to the present invention, a description is given of a vehicle monitoring system 1000 that includes a monitoring apparatus 100, a vehicle controller 200, a communication device 400, and an external terminal device 800 as an example, but the present invention is not limited thereto.

The invention claimed is:
1. A vehicle monitoring device comprising:
a monitoring level determining mechanism that determines a monitoring level of a vehicle, based in part on a state of the vehicle as determined from vehicle state detection sensors, on receipt of a request for a monitoring image, on a presence of a monitoring target object in a captured still image, and on a state of the monitoring target object in the captured still image as compared to a location, a movement, and an activity of the monitoring target object in previously captured still images, wherein the captured still image and the previously captured still images are received from a camera directed toward a periphery of the vehicle;

a monitoring image generating mechanism that determines a display mode based on the monitoring level to generate the monitoring image in the display mode using the captured still image and the previously captured still images, wherein the display mode is one of a moving image, a streaming image, and a still image, and wherein the monitoring image generating mechanism generates a monitoring image that is a moving image or a streaming image by successive sequencing of the captured still image and the previously captured still images; and a transmission mechanism that transmits information containing the monitoring image to an external terminal device via a communication line, wherein when receiving the request for the monitoring image from the external terminal device, the monitoring level determining mechanism determines the monitoring level to be a standard level, and when the monitoring level is determined to be the standard level, the monitoring image generating mechanism generates the monitoring image in the display mode of the still image.

2. The vehicle monitoring device as claimed in claim 1, wherein the monitoring level determining mechanism includes protocol to assess at least one of the following: orientation of the monitoring target object or a time the monitoring target object stays in a vicinity of the vehicle, wherein the monitoring level determining mechanism determines at least one of the following: a monitoring target object approaching the vehicle detected from the captured still image, a monitoring target object remaining in the vicinity of the vehicle for a predetermined time or more, and the monitoring image generating mechanism generates, in accordance with an enhanced level, the monitoring image in the display mode of either the moving image or the streaming image with a number of frames per unit time at a predetermined value or more.

3. The vehicle monitoring device as claimed in claim 1, wherein when receiving an abnormality occurrence signal from the vehicle, the monitoring level determining mechanism determines the monitoring level to be an enhanced level, and the monitoring image generating mechanism generates, in accordance with the enhanced level, the monitoring image in the display mode of either the moving image or the streaming image with a number of frames per unit time at a predetermined value or more.

4. The vehicle monitoring device as claimed in claim 1, wherein the monitoring image generating mechanism generates the monitoring image at a corrected frame rate corrected to increase a number of frames per unit time in accordance with the monitoring level when the monitoring level is detected by the monitoring level determining mechanism after sunset.

5. The vehicle monitoring device as claimed in claim 1, wherein, based on a moving speed of a monitoring target object of the captured still image captured by the camera, the monitoring image generating mechanism generates the monitoring image at a corrected frame rate correcting a number of frames per unit time in accordance with the monitoring level.

6. The vehicle monitoring device in claim 1, wherein when the monitoring level is in an enhanced level, the monitoring image generating mechanism sets a frequency at which the monitoring image is generated high, and the transmission mechanism transmits the monitoring image to the external terminal device in accordance with the frequency.

7. A vehicle monitoring device comprising:

means for determining a vehicle monitoring level based on a state of the vehicle or a periphery of the vehicle, wherein the monitoring level is determined from a plurality of monitoring levels;

means for generating a monitoring image based on a captured still image captured by a camera mounted on the vehicle at a frame rate in accordance with the monitoring level, wherein the camera is oriented outward toward the periphery, wherein the means for generating a monitoring image generates the monitoring image by successive sequencing of one or more of captured still images; and means for transmitting information containing the monitoring image via a communication line to an external terminal device, wherein when receiving a request for the monitoring image from the external terminal device, the monitoring level determination means determines the vehicle monitoring level to be a standard level, and when the monitoring level is determined to be the standard level, the monitoring image generating mechanism generates the monitoring image in a display mode of a still image and wherein means for monitoring generating generates the monitoring image at a rate greater than a still image when a target object is identified in the still image.

8. A vehicle monitoring method comprising:

receiving a captured still image from a camera mounted on the vehicle and directed to a periphery of the vehicle;

determining a monitoring level of the vehicle based in part on a state of the vehicle as determined based on vehicle state detection sensors, on presence of a monitoring target object in the captured still image, and on a state of the monitoring target object in the captured still image as compared to the state of the monitoring target object in previously captured still images received from the camera;

generating a monitoring image in a display mode of one of a moving image, a streaming video, and a still image based on the captured still image in accordance with the monitoring level;

transmitting generated information including the monitoring image to an external terminal device using a communication line; and when a request is received for the monitoring image from the external terminal device and the monitoring level is determined to be a standard level, generating the monitoring image in the display mode of the still image.

9. A vehicle monitoring device comprising:
a monitoring level determining mechanism that determines a monitoring level of a vehicle based on a detected vehicle condition by detecting a state of the vehicle and of a surroundings of the vehicle, wherein the monitoring level determining mechanism determines the monitoring level from a plurality of monitoring levels;
a monitoring image generating mechanism that calculates a compressibility in accordance with the monitoring level and generates a monitoring image compressing a captured still image captured by a camera mounted on the vehicle and directed to the surroundings of the vehicle at the compressibility calculated, wherein the monitoring image generating mechanism generates a monitoring image by successive sequencing of the captured still image and previously captured still images; and
a transmission mechanism that transmits information including generated monitoring image to an external terminal device, wherein
when receiving a request for the monitoring image from the external terminal device, the monitoring level determining mechanism determines the monitoring level to be a standard level, and
the monitoring image generating mechanism generates, in accordance with the standard level, the monitoring image by compressing the captured still image captured by the camera at a compressibility higher than a previously set standard compressibility;
wherein the monitoring level determining mechanism calculates a lower compressibility as the monitoring level increases; and
wherein the monitoring level determining mechanism determines the monitoring level of the vehicle as an enhanced level when a presence of a monitoring target object is detected from the captured still image captured by the camera; and
the monitoring image generating mechanism generates the monitoring image by compressing the captured still image captured by the camera at a compressibility lower than the previously set standard compressibility.

10. The vehicle monitoring device as claimed in claim 9, wherein
the monitoring level determining mechanism determines the monitoring level of the vehicle to be an enhanced level when a monitoring target object is detected that approaches the vehicle based on the captured still image captured by the camera; and
the monitoring image generating mechanism generates the monitoring image by compressing the captured still image captured by the camera at a compressibility lower than the previously set standard compressibility.

11. The vehicle monitoring device as claimed in claim 9, wherein
when a monitoring target object that stays in a vicinity of the vehicle for a predetermined time or more is detected, the monitoring level determining mechanism determines the vehicle monitoring level to be an enhanced level; and
the monitoring image generating mechanism generates the monitoring image by compressing the captured still image captured by the camera in accordance with the enhanced level at a compressibility lower than the previously set standard compressibility.

12. The vehicle monitoring device as claimed in claim 9, wherein
if an abnormality signal from the vehicle is obtained, the monitoring level determining mechanism determines the vehicle monitoring level to be an enhanced level; and
the monitoring image generating mechanism generates the monitoring image by compressing the captured still image captured by the camera in accordance with the enhanced level at a compressibility lower than the previously set standard compressibility.

13. The vehicle monitoring device as claimed in claim 9, wherein the monitoring image generating mechanism generates the monitoring image at a corrected compressibility that is set low in accordance with the monitoring level when the monitoring level is detected by the monitoring level determining mechanism after sunset.

14. The vehicle monitoring device as claimed in claim 9, wherein, when a monitoring target object is included in the captured still image captured by the camera, the monitoring image generating mechanism generates the monitoring image compressing the captured still image containing the monitoring target object at a corrected compressibility that is set lower in accordance with the monitoring level.

15. The vehicle monitoring device as claimed in claim 9, wherein
the monitoring image generating mechanism increases a frequency of generating the monitoring image when the monitoring level is determined to be an enhanced level; and
the transmission mechanism transmits the monitoring image to the external terminal device in accordance with the frequency.

16. A vehicle monitoring method comprising:
determining a monitoring level of a vehicle based on a vehicle condition by detecting a state of the vehicle or of a surroundings of the vehicle, wherein the state of the vehicle or of the surroundings of the vehicle is one of request for monitoring image, still object, monitoring object separating, monitoring object approaching without motion, monitoring object approaching with motion, monitoring object staying, and abnormality detected by vehicle state detection sensors;
calculating a compressibility based on the monitoring level;
generating a monitoring image compressing a captured still image captured by a camera mounted on the vehicle by the compressibility calculated, wherein the monitoring image is generated by successive sequencing of the captured still image and previously captured still images;
transmitting information including the monitoring image generated to an external terminal device; and
when the monitoring level is determined to be a standard level, generating the monitoring image by compressing the captured still image captured by the camera at a compressibility higher than a previously set standard compressibility.

17. A vehicle monitoring device comprising:
a plurality cameras mounted on a vehicle exterior for capturing still images of a periphery of the vehicle;
a monitoring image generating mechanism that, when presence of a monitoring target object is detected in the periphery of the vehicle, generates a moving image indicating a state change in the periphery of the vehicle as a monitoring image based on a captured still image including the image corresponding to the monitoring target object, wherein the moving image is generated by successive sequencing of the captured still image and previously captured still images; and a transmission mechanism that transmits the monitoring image to an external terminal device using a communication line, wherein, when the monitoring target object is not detected in the periphery of the vehicle, monitoring image generating mechanism generates a still image showing a temporary state of a vicinity of the vehicle based on the captured still image captured by the camera.

18. The vehicle monitoring device as claimed in claim 17, wherein
the monitoring image generating mechanism compares a reference monitoring image acquired at a reference monitor time representing a reference when monitoring the surroundings of the vehicle and a comparison image captured by the camera in a single or plurality of monitoring timings after the reference monitoring time to generate the monitoring image based on a difference image in response to a change in image data between the reference monitoring image and the comparison image; and
the transmission mechanism transmits the monitoring image to the external device via the communication line after having sent the reference monitoring image to the external device via the communication line.

19. The vehicle monitoring device as claimed in claim 17, wherein the monitoring image generating mechanism:
compares a K-th comparison image (wherein K is a natural number) captured at a K-th monitoring timing after a reference monitoring timing and the reference monitoring image to extract a K-th difference image of a predetermined region containing the difference image of the two images;
compares the K-th comparison image captured at the K-th monitoring timing after the reference monitoring timing and a (K−1)-th comparison image captured at a (K−1)-th timing immediately before the K-th monitoring timing;
attaches to the image data of invariable region having no difference over the reference monitoring image of the K-th difference image a first identifier;
attaches to a duplicate change region included in the (K−1) comparison image as well of the K-th difference image a second identifier;
attaches to a most receipt change region included only in the (K−1)-th difference image of the K-th difference image a third identifier; and
replaces the image data of the image region of the K-th difference image to which the third identifier is attached with the image data of the K-th comparison image corresponding to the image region; and
generates the information including the image data of the K-th comparison image replaced, the first identifier and the second identifier as the monitoring image.

20. The vehicle monitoring device as claimed in claim 17, wherein, when a moving speed of the monitoring target object calculated based on the captured still image is less than a predetermined value, the monitoring image is generated by decreasing a frame rate.

21. A vehicle monitoring system using the vehicle monitoring device as set forth in claim 17, further comprising:
a terminal device capable of information transfer to and from the vehicle monitoring device, wherein the terminal device comprises;

a communication mechanism to communicate with the vehicle monitoring device;
a display image generating mechanism to generate an image for display based on the monitored image acquired through a communication means; and
a display mechanism for displaying the image for display generated by the display image generating mechanism.

22. A vehicle monitoring method comprising:
acquiring a plurality of captured still images of a surroundings of a vehicle, the images each associated with a discrete region of the surroundings of the vehicle;
when an image corresponding to a monitoring target object has been detected in one of the captured still images, generating a moving image as a monitoring image for the associated region that indicates a state of change in the surroundings of the vehicle based on the captured still image including a monitoring target object, while images associated with discrete regions of the surroundings lacking a monitoring target object are generated as still images, wherein the moving image is generated by successive sequencing of the captured still image and the plurality of captured still images;
when the monitoring target object has not been detected in at least one of the captured still image, generating a still image showing a temporary state of the surroundings of the vehicle based on the captured still image; and
transmitting the monitoring images to an external terminal device, such that the plurality of captured still images depicts the surroundings of the vehicle.

23. The vehicle monitoring device as claimed in claim 1, wherein, when a detected monitoring target object is separating from the vehicle or is a stationary object, the monitoring level determining mechanism determines the vehicle monitoring level to be the standard level and the monitoring image generating mechanism generates the monitoring image in the display mode of the still image.

24. The vehicle monitoring device as claimed in claim 9, wherein, when a detected monitoring target object is separating from the vehicle, the monitoring level determining mechanism determines the monitoring level to be a standard level, and
in accordance with the standard level, the monitoring image generating mechanism generates the monitoring image by compressing the captured still image captured by the camera at the previously set standard compressibility or higher.

25. The vehicle monitoring device of claim 1 wherein the monitoring level determining mechanism is operatively connected to a plurality of motion sensors positioned on one or more exterior locations of the vehicle and monitoring an exterior periphery surrounding the vehicle.

26. The vehicle monitoring device of claim 1, wherein when the presence of a monitoring target object is detected from the monitoring image captured by the camera, the monitoring level determining mechanism determines that the monitoring level should be elevated to be an enhanced level, and the monitoring image generating mechanism generates the monitoring image in the display mode of either the moving image or the streaming image with a number of frames per unit time at a predetermined value or greater in accordance with the enhanced level.

* * * * *